(12) United States Patent
Seok et al.

(10) Patent No.: US 8,312,338 B2
(45) Date of Patent: Nov. 13, 2012

(54) METHODS OF TRANSMITTING AND RECEIVING DATA IN COMMUNICATION SYSTEM

(75) Inventors: Ji Ae Seok, Anyang-si (KR); Min Seok Oh, Anyang-si (KR); Ki Hyoung Cho, Anyang-si (KR); Young Seob Lee, Anyang-si (KR); So Yeon Kim, Anyang-si (KR); Ji Wook Chung, Anyang-si (KR); Seung Hyun Kang, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 603 days.

(21) Appl. No.: 12/449,221

(22) PCT Filed: Feb. 4, 2008

(86) PCT No.: PCT/IB2008/000238
§ 371 (c)(1),
(2), (4) Date: Jul. 29, 2009

(87) PCT Pub. No.: WO2008/093233
PCT Pub. Date: Aug. 7, 2008

(65) Prior Publication Data
US 2010/0031110 A1     Feb. 4, 2010

(30) Foreign Application Priority Data

Feb. 2, 2007 (KR) .................... 10-2007-0011128
Jan. 3, 2008 (KR) .................... 10-2008-0000845
Jan. 3, 2008 (KR) .................... 10-2008-0000846

(51) Int. Cl.
*G08C 25/02* (2006.01)
(52) U.S. Cl. ................................ 714/748
(58) Field of Classification Search ............ 714/748
See application file for complete search history.

(56) References Cited

U.S. PATENT DOCUMENTS 7,500,166 B2 *  3/2009  Miyazaki et al. ........... 714/748
2002/0146074 A1  10/2002  Ariel et al.
2008/0260053 A1 *  10/2008  Yun et al. ................. 375/260

(Continued)

FOREIGN PATENT DOCUMENTS
WO     WO 02/067429     8/2002

OTHER PUBLICATIONS

Girod et al., "Feedback-Based Error Control for Mobile Video Transmission", Proceedings of the IEEE, vol. 87, No. 10, Oct. 1999, pp. 1707-1723.

(Continued)

*Primary Examiner* — Albert Decady
*Assistant Examiner* — Enam Ahmed
(74) *Attorney, Agent, or Firm* — McKenna Long & Aldridge LLP

(57) ABSTRACT

A data transmitting and receiving method is disclosed. In transmitting a response signal for a transmission signal from at least one transmitter, the present invention includes receiving at least one data block from the at least one transmitter, the at least one data block grouped into at least one group and then transmitted by the at least one transmitter, checking whether each data block is successfully received for the at least one data block belonging to the corresponding group per the group, selecting a transmission scheme of transmitting a response signal instructing a presence or non-presence of successful reception of the each data block to the at least one transmitter, and transmitting a response signal for the each data block to the at least one transmitter by the selected response signal transmission scheme. Hence, the present invention reduces overhead of control information necessary for data transmission.

22 Claims, 13 Drawing Sheets

U.S. PATENT DOCUMENTS

2010/0061475 A1* 3/2010 Mo et al. .................. 375/261
2010/0223521 A1* 9/2010 Kim et al. ................. 714/748

OTHER PUBLICATIONS

Ajib et al., "Acknowledgment operations in the RLC layer of GPRS", IEEE International Workshop on Mobile Multimedia Communications, Nov. 1999, pp. 311-317.

Stockhammer et al., "Feedback and Error Protection Strategies for Wireless Progressive Video Transmission", IEEE Transactions on Circuits and Systems for Video Technology, vol. 12, No. 6, Jun. 2002, pp. 465-482.

Hofbauer et al., "ARQ Concept for the UMTS Long-Term Evolution", IEEE 64th Vehicular Technology Conference, Sep. 2006.

* cited by examiner one data for multi user one data for one user

METHODS OF TRANSMITTING AND RECEIVING DATA IN COMMUNICATION SYSTEM

This application claims priority to International Application No. PCT/IB2008/000238 filed on Feb. 4, 2008, which claims priority to Korean Patent Application No. 10-2007-0011128, filed on Feb. 2, 2007, Korean Patent Application No. 10-2008-0000845, filed Jan. 3, 2008 and Korean Patent Application No. 10-20080000846, filed Jan. 3, 2008, all of which are incorporated by reference for all purposes as if fully set forth herein.

TECHNICAL FIELD

The present invention relates to a communication system, and more particularly, to a method of transmitting and receiving a response signal in a mobile communication system.

BACKGROUND ART

As a general method for overcoming error generated in the course of communication, there is such a scheme as automatic repeat request (hereinafter abbreviated ARQ) and error correction. When error is generated in the course of communication, a receiver informs a transmitter of the error generation and the transmitter then retransmits a data block from which the error is generated. This is called ARQ. As representative ARQ schemes, there are stop-and-wait ARQ, continuous ARQ and adaptive ARQ. In order to use ARQ, a reverse channel for feedback is necessary and a buffer is mandatory for ARQ system that should memorize a data block in transmission.

FIG. 1 is a diagram for operational principle of stop-and-wait HARQ.

Referring to FIG. 1, a transmitter Tx transmits a data block corresponding to an index '1'. A receiver Rx receives the data block corresponding to the index '1' and then transmits a response signal to the transmitter to inform the transmitter whether the receiver has correctly received the data block. For this, if the receiver decides to have correctly received the data block, it transmits such a response signal as ACK (acknowledgement) to the transmitter. If the receiver decides not to have correctly received the data block, it transmits such a response signal as NAK (No ACK) to the transmitter. If the transmitter Tx receives a NAK signal, it retransmits the data block corresponding to the index '1' to the receiver. In stop-and-wait ARQ scheme, after a data block has been transmitted, it is unable to transmit a next data block until ACK or NAK is received. So, transmission efficiency of the stop-and-wait ARQ scheme is not good. To overcome this disadvantage, continuous ARQ is used. In the continuous ARQ scheme, after data block have been transmitted, if a receiver sends NAK indicating that error has been generated, all block after the error generation are retransmitted or the corresponding erroneous block is retransmitted only. The continuous ARQ is effective if applied to a system having a long radio wave delay. The continuous ARQ (NAK is sent without sending ACK each time error is generated) is classified into two types, Go-Back-NARQ and Selective-Repeat ARQ.

In Go-Back-NARQ, after N continuous data blocks have been transmitted, if the transmission fails, all data blocks transmitted after the erroneous data block are retransmitted. In Selective-Repeat ARQ, an erroneous data block is selectively retransmitted. Theses ARQ schemes are combined with error correction scheme to perform more efficient error control. This is explained as follows.

HARQ (Hybrid Automatic Repeat reQuest) is a technique for controlling error by combining retransmission and error correction with each other and maximizes error correction coding capability of data received in retransmission. The error correction scheme is classified into Backward Error Correction (BEC) and Forward Error Correction (FEC). In BEC, a transmitter retransmits an erroneous data block to restore the erroneous data block. In FEC, a receiver receives an erroneous data block sent by a transmitter and then corrects the corresponding error. Normally, Forward Error Correction (FEC) is frequently used as an error correction scheme in HARQ. If HARQ is adopted, when a receiver fails in restoring a data block, the receiver makes a request for retransmission to a transmitter and then combines stored and retransmitted data together to provide better performance. Stop-and-wait HARQ preferentially used as ARQ scheme is simplest and efficient transmission scheme but has link transmission efficiency lowered due to a rounding trip time (hereinafter abbreviated RTT) taken to exchange ACK/NAK between transmitter and receiver of data. To complement this, N-channel stop-and-wait HARQ protocol scheme is used.

FIG. 2 is a diagram to explain a basic operation of N-channel stop-and-wait HARQ scheme according to a related art.

Referring to FIG. 2, in N-channel stop-and-wait HARQ, a plurality of independent stop-and-wait HARQs are activated for a time not to use a transmission link until ACK/NAK is transmitted and received. Generally, in stop-and-wait HARQ scheme, a data receiver confirms success or failure of data reception through error detection code such as CRC (Cyclic Redundancy Check). In the following description, for clarity and convenience, a data unit for detecting error is named HARQ process block. If data error is not detected, a receiver transmits ACK signal. If error is detected, a receiver transmits NAK signal. Data transmitter having received the ACK signal transmits next data. Data transmitter having received the NAK signal retransmits the corresponding erroneous data. In doing so, a format of the retransmitted data can be changed according to HARQ type. Besides, if transmission bandwidth is large or if data is transmitted via multi-antenna, it is able to transmit a plurality of HARQ process blocks. In particular, a plurality (m) of HARQ processes can simultaneously transmit m HARQ process blocks for a predetermined time or a time interval.

FIG. 3 is a diagram to explain an operation in case of transmitting a plurality of HARQ process blocks via multi-antenna or the like. Referring to FIG. 3, a receiver having received data is able to transmit m ACK/NAK signals for m HARQ process blocks to a data transmitter.

Described in the following description is a resource allocation scheme in a basic physical area of a mobile communication system for transmitting and receiving at least one HARQ process block and at least one corresponding response signal.

FIG. 4 is a diagram for a resource allocating method in time and frequency domains of IEEE 802.16e system as a kind of a multi-carrier system. FIG. 4 shows a frame structure of OFDMA (orthogonal frequency divisional multiple access) physical layer of a related art.

Single frame is constructed with a downlink subframe for downlink, an uplink subframe for uplink and TTG (transmit-receive time gap) and RTG (receive-transmit time gap) as time gaps for discriminating uplink and downlink subframes.

The downlink subframe begins with a preamble used for synchronization and equalization in a physical layer and then defines a whole structure of frame through downlink MAP (DL-MAP) and uplink MAP (UL-MAP) messages in a broadcast format for defining positions and usages of bursts allocated to uplink and downlink, respectively. [In this disclosure, DL-MAP, DL-MAP IE, UL-MAP, UL-MAP IE and the like are implemented with reference to IEEE 802.16Rev-D1 for DL-MAP, DL-MAP IE, UL-MAP, UL-MAP IE and the like of IEEE 802.16e system that supports OFDMA of a related art.]

The DL-MAP message defines a usage assigned per a burst for a downlink interval in a burst-mode physical layer, and the UL-MAP message defines a usage of burst (UL burst) allocated to an uplink interval. In information element configuring DL-MAP, a downlink traffic interval for a user is discriminated by a downlink interval usage code (hereinafter abbreviated DIUC), a connection identifier (CID) and burst position information (subchannel offset, symbol offset, number of subchannels, number of symbols) In information element configuring the UL-MAP message, a usage is decided per CID by uplink interval usage code (hereinafter abbreviated UIUC) and a position of a corresponding interval is specified by duration. In this case, a per-interval usage is decided according to UIUC value used for UL-MAP and each interval starts from a point distant from a previous IE (information element) start point by duration specified by UL-MAP IE.

The UL-MAP assigns usage authority for uplink channel. The UL-MAP defines a usage method for uplink bursts using continuous information elements defining a usage method of each uplink interval and also defines a usage method of OFDMA symbols and uplink resources allocated by a unit of subchannel block. Information element for uplink specifies band allocation information on uplink. Each UL-MAP message contains at least one IE to indicate an end of a last burst. Order of information elements carried by UL-MAP is decided by a physical layer in use.

CID allocates IE as an address of unicast, multicast or broadcast. In case that bandwidth approval is explicitly specified to be assigned, basic CID of user equipment is used as a CID value. UIUC is used to specify an uplink usage format and an uplink burst profile associated with the uplink usage format. In case of each UIUC to be used by UL-MAP, Uplink-Burst-Profile should be included in an uplink channel descriptor (hereinafter abbreviated UCD). Information elements (IEs) should be fully supported by user equipments. In creating UL-MAP message, a base station can use any one of the information elements. TTG (transmit-receive time gap) and RTG (receive-transmit time gap), which are guard times for discriminating uplink and downlink transmission times, are inserted in a middle part and a last part of a frame between uplink and downlink, respectively. For instance, IEEE 802.16e system has RTG=121.2 µS and RTG=40.4 µs.

In the downlink subframe to which downlink burst (DL burst) is allocated, there are PUSC (partial usage of subcarrier) subchannel, diversity subchannel and AMC (adaptive modulation and coding) subchannel. In the uplink subframe, there are diversity subchannel and AMC subchannel. PUSC subchannel, diversity subchannel, AMC subchannel and the like have separate transmission intervals, each of which is constructed with continuous symbols, respectively.

PUSC subchannel in downlink is defined with two symbols and a single PUSC subchannel is constructed with four pilot subcarriers and forty-eight subcarriers. Diversity subchannel in downlink is constructed with forty-eight subcarriers spread on a whole band in a single symbol.

In uplink, a tile configured by collecting three neighbor subcarriers in three continuous symbol intervals is a basic allocation unit to configure a diversity subchannel. The diversity subchannel in uplink is constructed with six tiles each of which is spread on a whole frequency band.

A basic unit for configuring AMC subchannel is a bin constructed with nine neighbor subcarriers in a same symbol. Four bins exist on a single band, and AMC subchannel is constructed with six neighbor bins existing on the same band.

Symbol interval, in which subcarriers exist to configure subchannel, is defined as a slot. Hence, a length of slot varies in accordance with a type of subchannel for dividing uplink and downlink.

DISCLOSURE OF THE INVENTION

Technical Problem

However, as the number of HARQ process blocks simultaneously transmitted in a unit time is incremented, resources to transmit ACK/NACK are increased. Hence, overhead of control signal including a response signal is increased to reduce system efficiency.

Technical Solution

Accordingly, the present invention is directed to a method of transmitting and receiving data in a communication system that substantially obviate one or more of the problems due to limitations and disadvantages of the related art.

An object of the present invention is to provide a method of transmitting and receiving a response signal to a transmission signal in a mobile communication system.

Another object of the present invention is to provide a method of securing a resource of a response signal in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in transmitting a response signal for a transmission signal from at least one transmitter, a method for a receiver to transmit the response signal comprises receiving at least one data block from the at least one transmitter, the at least one data block grouped into at least one group and then transmitted by the at least one transmitter, checking whether the at least one data block contained in corresponding group is successfully received per each group, transmitting the response signal instructing a presence or non-presence of successful reception of the data block to the at least one transmitter by specific transmission scheme selected from among a first scheme of transmitting the response signal per the data block, a second scheme of transmitting the response signal by including a group response signal for the each group and a third scheme of transmitting an index of a data block response signal set per each group.

To further achieve these and other advantages and in accordance with the purpose of the present invention, in receiving a response signal for a transmission signal from a receiver by at least one transmitter in a communication system, a method of receiving the response signal for the transmission signal in the at least one transmitter of the communication system includes receiving at least one response signal instructing a presence or non-presence of successful reception of at least one data block transmitted from the receiver, wherein the at least one data block is grouped into at least one group, deciding transmission scheme of the response signal from among the first to third scheme mentioned above, and checking a presence or non-presence of successful transmission of the at least one data block transmitted to the receiver according to the decided response signal transmitting scheme and the at least one response signal.

Preferably, the second scheme comprises transmitting a single response signal for each group, and the index in the third scheme instructs a specific combination of the response signal for the at least one data block in an index table as a set of combinations of the response signal for the at least one data block per each group.

Preferably, in said transmitting the response signal, the selection of the transmitting scheme from among the first to third schemes is decided via instruction information from the at least one transmitter or by the receiver in accordance with an available radio resource state.

It is to be understood that both the foregoing general description and the following detailed description are exemplary and explanatory and are intended to provide further explanation of the invention as claimed.

Advantageous Effects

A method of transmitting and receiving a response signal to a transmission signal in a mobile communication system according to the present invention provides the following effects or advantages.

First of all, the present invention minimizes the number of linearly increasing response signals, thereby raising data transmission efficiency.

Secondly, when a transmitter fails to appropriately allocate resources for a response signal to a receiver to send the response signal, the receiver can make a response using minimal resources.

Thirdly, the present invention realizes a method of transmitting and receiving different response signals between transmitter and receiver in a communication system, thereby raising system efficiency.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Figure 1:
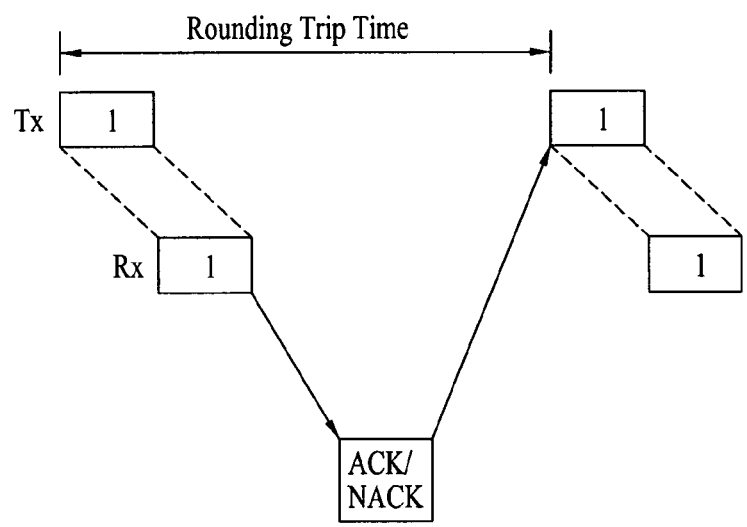
FIG. 1 is a block diagram for operational principle of stop-and-wait HARQ.

Reference will now be made in detail to the preferred embodiments of the present invention, examples of which are illustrated in the accompanying drawings. In embodiments explained in the following description, technical features of the present invention are applied to such a similar mobile communication system as E-UMTS (evolved universal mobile telecommunications system) called LTE (long term evolution), IEE 802.16e (or IEE 802.16m), Wibro system and the like.

E-UMTS is the system evolving from the conventional WCDMA UMTS and its basic standardization is in progress by 3GPP ($3^{rd}$ Generation Partnership Project). For details of technical specifications of UMTS and E-UMTS, Release 7 and Release 8 of '$3^{rd}$ Generation Partnership Project; Technical Specification Group Radio Access Network' can be referred to, respectively. The following techniques include multi-antenna using scheme and are applicable to various communication systems.

Communication system is widely arranged to provide various communication services for voice, packet data and the like. This technology is usable in downlink or uplink. Downlink means communication to a user equipment from a base station, whereas uplink means communication to a base station from a user equipment. Generally, a base station is a fixed point communicating with a user equipment and includes a network except a user equipment in a communication system including upper layers as well as a physical transmitting end. So, in the present invention, a network and base station have the partially same meaning symmetric to a user equipment.

User equipment can be fixed or have mobility. The present invention is usable for a single carrier or multi-carrier communication system. Multi-carrier system can utilize OFDM (orthogonal frequency division multiplexing) or other multi-carrier modulation schemes.

As mentioned in the foregoing description, HARQ process indicates a data unit from which error can be detected. When a single user transmits/received data, a plurality of data discriminated by error-detectable unit have HARQ process IDs of their own, respectively and are discriminated from each other through the HARQ process IDs. Since HARQ processes are discriminated by user ID in accordance with a specific user, they can have HARQ process IDs. If a transmission bandwidth is wide enough, a plurality of HARQ process blocks are generated and transmitted by activating a plurality of HARQ processes by a single user unit. In a communication system provided with a plurality of transmitting antennas, the HARQ process blocks independent from each other can be discriminated from each other n accordance with the number of physical antennas or virtual layers, i.e., in accordance with the number of simultaneously transmittable data with reference to a error-detectable data unit. A plurality of HARQ processes can be coded by different channel coding schemes or by the same channel coding scheme. If they are coded by the same channel coding scheme, each of the HARQ process blocks may be coded by a random coding rate. By considering channel situation, systems use various channel coding schemes and modulation schemes or transmit data by differentiating sizes of the transmitted data.

Figure 5:
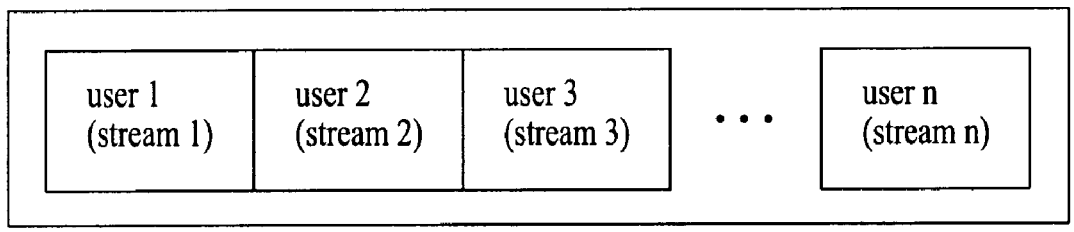
FIG. 5 is a diagram to explain usage of a plurality of data streams under a plurality of users in a single antenna according to one embodiment of the present invention.
Figure 6:
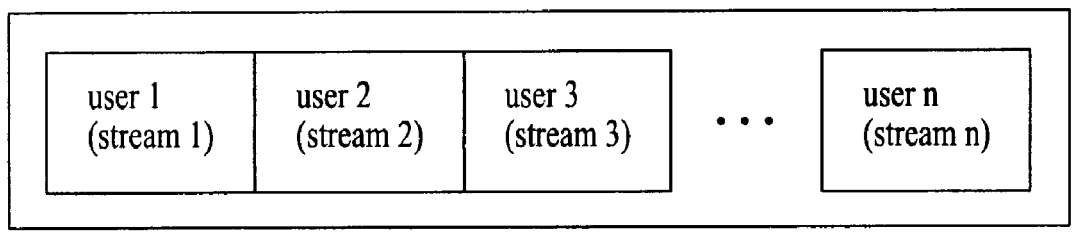
FIG. 6 is a diagram to explain usage of a plurality of data streams under a single user in a single antenna according to one embodiment of the present invention.

FIG. 5 is a diagram to explain usage of a plurality of data streams under a plurality of users in a single antenna according to one embodiment of the present invention, and FIG. 6 is a diagram to explain usage of a plurality of data streams under a single user in a single antenna according to one embodiment of the present invention. In the embodiment of the present invention shown in FIG. 5, a data stream means HARQ process block that is an example of a data block. As mentioned in the foregoing description, since users are discriminated from each other via user IDs, IDs of a plurality of data streams simultaneously processed may be identical to each other. Yet, in the present embodiment, for clarity, shown is a case that each user has HARQ process block ID (i.e., user1 has stream 1 and user2 has stream 2, in FIG. 5) identical to ID of the corresponding user.

In one embodiment of the present invention, proposed is a method for reducing overhead of a response signal in case that m HARQ process blocks, which are m data streams having different IDs to which stop-and-wait HARQ is applied for a unit time in m multi-antenna system under a single user, are transmitted. In the following description of embodiments of the present invention, a data stream means HARQ process block.

In the present embodiment, to transmit a response signal for at least one or more HARQ process blocks transmitted by a specific time, frequency or space unit, the at least one or more HARQ process blocks are classified into at least one or more groups and a group response signal per the group (in particular, group ACK/NAK signal) or a response signal for each of the HARQ process blocks belonging to the corresponding group (in particular, ACK/NACK signal for each of the HARQ process blocks) is then transmitted. In particular, the group ACK/NAK signal as the group response signal is a response signal according to whether the response signal for the at least one HARQ process block belonging to the corresponding group is identical or different, and the ACK/NACK signal, which is not the group ACK/NAK signal as the group response signal, for each of the HARQ process blocks is a response signal for each HARQ process block. Reference for grouping can be decided according to HARQ process block receiving antenna sequence, HARQ process block transmitting antenna sequence, selection sequence by a prescribed interval, HARQ process block characteristic or the like. In grouping, it is unnecessary for each group to have the same HARQ process block. In aspect of complexity, the blocks can be classified into one group only. In case of dividing the blocks into at least two groups, both a transmitter and a receiver should have information on the classified group and information on the number of HARQ process blocks per group. Preferably, such information is previously known to both parties of transmission and reception, e.g., user equipment and base station, prior to the transmission and reception, is obtained via a prescribed signal or is transmitted via a prescribed random signal.

According to one embodiment of the present invention, operation is carried out by dividing an interval into an interval having a reception success rate greater than a first threshold and an interval having a reception success rate smaller than a second threshold in accordance with a reception success rate of data such as HARQ process block in a receiver. The present invention proposes a scheme for deciding the thresholds as follows.

First of all, a fixed scheme, in which a transmitter and a receiver have a prefixed first threshold and a pre-fixed second threshold, respectively, is possible. And, a variable scheme, in which a transmitter and a receiver survey a channel environment and the like and then amend first and second thresholds suitable for the surveyed channel environment and the like, is possible. The variable scheme is explained in detail as follows. Distribution rates of ACK and NAK signals of response signals including a group response signal in a predetermined time or interval from one side to the other side are accumulated and first and second thresholds are decided based on the accumulated distribution rates. Alternatively, first and second thresholds are decided based on CINR (carrier to interference and noise ratio) value of a specific channel or RSSI (received signal strength indicator) value. Alternatively, a receiver analyzes a channel environment through a pilot signal and the like of a transmitter and then decides transmission success probability. In the following embodiments of the present invention, a first threshold indicates the same meaning of specific transmission success probability and a second threshold indicates the same meaning of specific transmission failure probability. And, retransmission probability indicates both first and second thresholds.

In the first place, explained in the following description is a case that probability for a receiver to successfully receive such a data block as HARQ process block is higher than a first threshold (i.e., specific transmission success probability). If probability for a transmitted data block to be successfully received is high, i.e., in case that probability for ACK signal to be generated is high, and if all decoding results for HARQ process blocks belonging to a group are ACK, it is able to send a group ACK signal that is a 1-bit group response signal. Since ACK signal is sent for each HARQ process block, overhead increases. So, it is preferable that a group ACK signal is sent as a 1-bit group response signal. In this case, if NAK is generated for any one of the HARQ process blocks within the group, it is able to send ACK/NACK signal for each HARQ process block as a group response signal together with group NAK signal. In this case, it is able to send a group NAK signal and a response signal (ACK or NAK signal) for the corresponding configuration HARQ process block only without sending a group ACK signal as a group response signal. Thus, in case that transmission success probability is greater than a prescribed value, group NAK relevant response signals are sent as a group response signal instead of sending group ACK signal as a group response signal. And, this scheme is proposed as an implicit group response scheme. On the other hand, a scheme for sending a group ACK signal together is proposed as an explicit group response scheme. Position of ACK/NAK response signal for each configuration HARQ process block including the group response signal is not necessarily fixed but can be changed.

Figure 7:
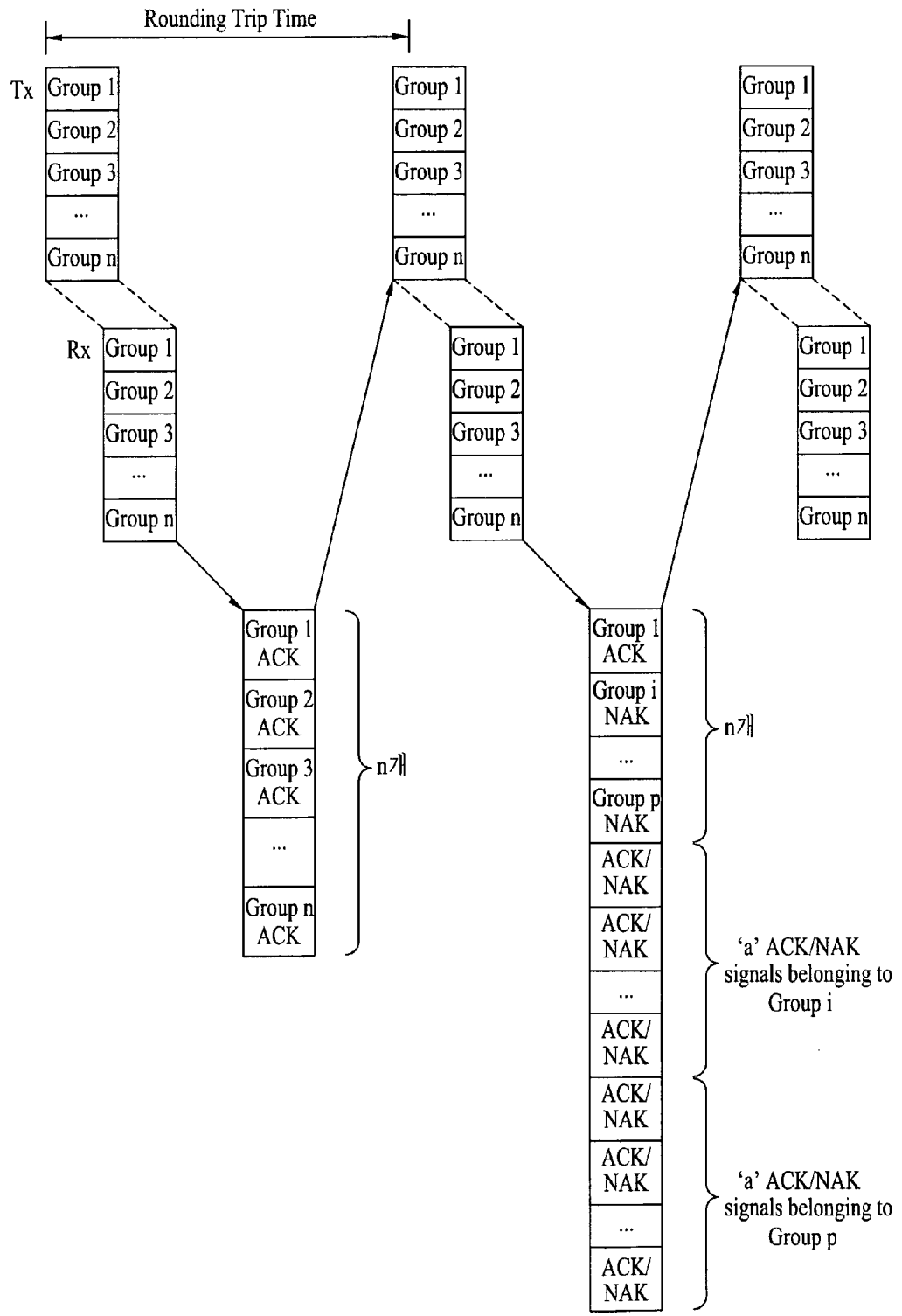
FIG. 7 is a diagram to describe transmission and reception of a response signal adopting an explicit group response scheme if it is decided that reception success probability of data transmitted in a communication system according to one embodiment of the present invention is high.
Figure 8:
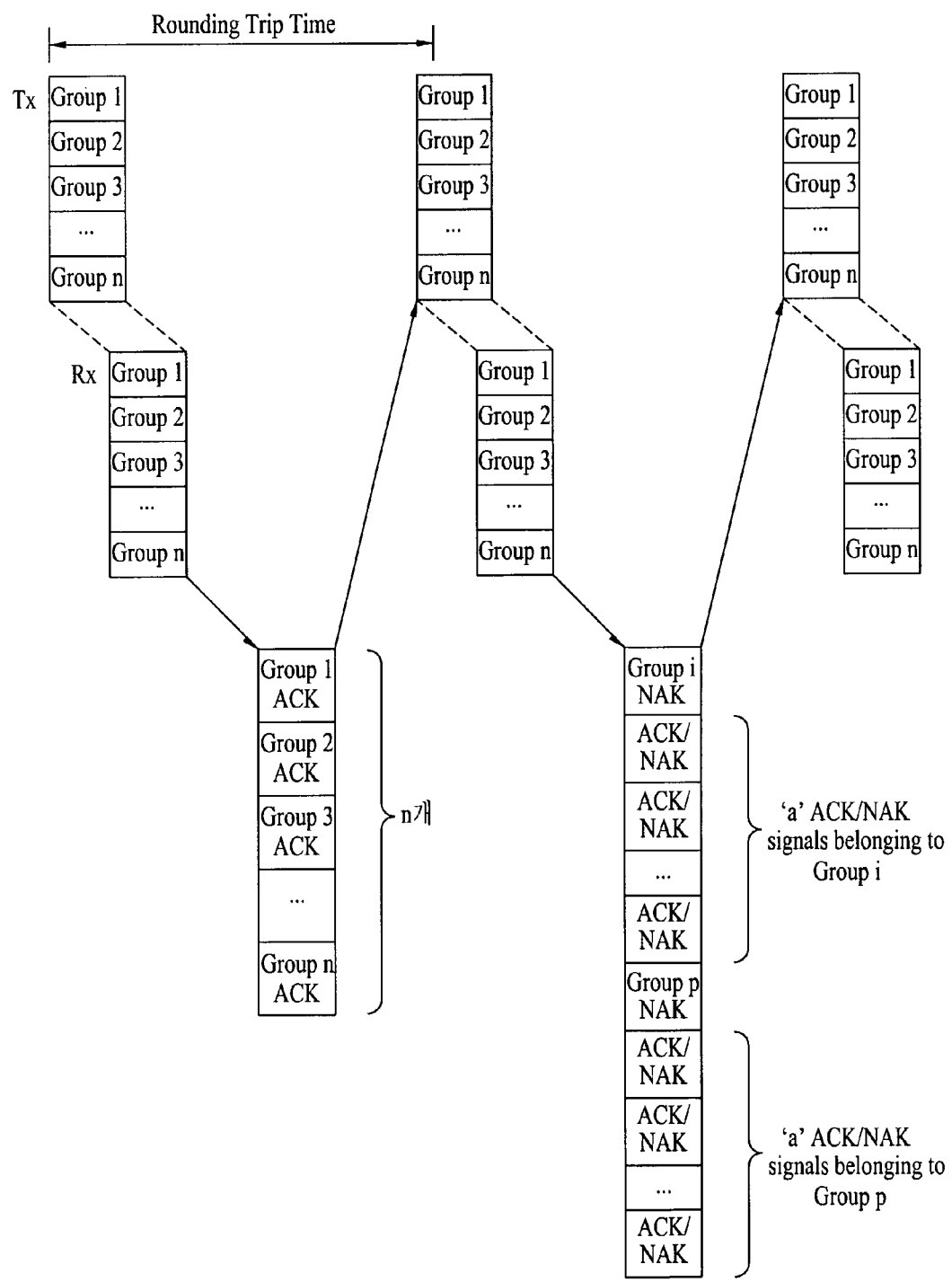
FIG. 8 is a diagram to describe transmission and reception of a response signal adopting an implicit group response scheme if it is decided that reception success probability of data transmitted in a communication system according to one embodiment of the present invention is high.

FIG. 7 and FIG. 8 are diagrams for a method of transmitting/receiving a response signal in case that reception success probability of data transmitted in a communication system according to one embodiment of the present invention is set high. Referring to FIG. 7 and FIG. 8, in case that m HARQ process blocks are transmitted, a receiver classifies the received HARQ process blocks into at least one group by referring to the aforesaid group classification reference and then checks a presence or non-presence of reception success/failure of the HARQ process blocks within the corresponding group. As mentioned in the foregoing description, since CRC bits or parity bits are contained in each of the HARQ process blocks, it is able to perform error check.

In the present embodiment, it is assumed that HARQ process blocks are divided into total n groups in order of transmission of HARQ process. And, it is also assumed that total m (=n×a) HARQ process blocks are transmitted with a HARQ process block per the group.

If HARQ process blocks amounting to 'a' within an $i^{th}$ group are fully and successfully received, group-i ACK signal is transmitted to a transmitter only. Yet, if any one of the 'a' HARQ process blocks is not successfully received, group-I NAK signal is transmitted to the transmitter only and ACK/NAK signal for each of the 'a' HARQ process blocks can be transmitted.

In this case, transmission is carried out by setting the number of ACK/NAK information transmitted together with the group-i NAK signal to (a-1) or smaller, information on HARQ process block having ACK generation is transmitted only, or information on HARQ process block having NAK generation is transmitted only. If a transmitter fails to obtain ACK/NAK information, more delays may occur in retransmission. So, it is preferable that the number of ACK/NAK signals transmitted together with the group-i NAK signal is set to 'a'.

As shown in FIG. 7 and FIG. 8, group ACK signals are transmitted as group response signals in entire groups in transmission of first data blocks but NAK is generated from HARQ process blocks belonging to $i^{th}$ and $p^{th}$ groups in transmission of second data blocks. Hence, a receiver is able to send group ACK signal of the group having the ACK generation, group NAK signal of the group having the NAK generation and ACK/NAK signal of the configuration HARQ process block by applying explicit response scheme or may send group NAK signal of the group having the NAK generation and ACK/NAK signal of the configuration HARQ process block only by applying implicit response scheme. FIG. 7 depicts a case that explicit group response scheme is adopted and FIG. 8 depicts a case that implicit group response scheme is adopted. As mentioned in the foregoing description, position of ACK/NAK signal for each configuration HARQ process block including the group response signal is not always necessarily fixed as shown in FIG. 7 or FIG. 8 but can be changed.

Receiver having received response signal transmits new HARQ process bock for HARQ process block corresponding to group ACK signal. In case of receiving group NAK signal, the transmitter checks response signal of HARQ process block, configuring a group, received together with the group NAK signal, sends HARQ process block relevant to a previously transmitted process block by HARQ operating scheme that will be explained later for the HARQ process block for which NAK signal has been sent, and transmits new HARQ process block for ACK signal.

HARQ scheme used for the present embodiment can be classified into IR (incremental redundancy) scheme and CC (chase combining) scheme. The CC scheme is the scheme for retransmitting data used for initial transmission from a transmitter for retransmission. In this case, it is able to additionally perform power control in performing retransmission. In case that transmission is carried out by CC scheme, previously transmitted data is identical to data newly transmitted due to NAK signal. Hence, a receiver raises reception SNR (signal to noise ratio) by combining both data together, thereby raising a reception success rate.

On the other hand, the IR scheme is a method of raising a reception success rate by lowering a code rate of data received by a receiver in a manner of transmitting a portion of coded data that was not used for initial transmission. In case that a transmitter performs channel coding, data is encoded at a relatively high code rate and is then initially transmitted. And, a portion that was not used for initial transmission can be included to be used for retransmission of the data.

The transmitter and receiver carry out the above-described process unless data to be transmitted fails to exist.

In the following description, explained is a case that probability for transmitted data to be successfully received in environment of communication system is low. Explained in the following description is a case that probability for such data as HARQ process block transmitted by channel environment of a communication system to be successfully received by a receiver is lower than a second threshold (i.e., specific transmission failure probability) In case that probability for transmitted data to be successfully received is low, i.e., in case that probability for NAK signal to be generated is high, if decoding results for HARQ process blocks belonging to a group are fully NAK, it is able to send 1-bit group NAK signal as a group response signal. If NAK signal is send for each HARQ process block, overhead increases. Hence, it is preferable that 1-bit group ACK signal is send as a group response signal. In this case, if ACK is generated for any one of the HARQ process blocks within the group, it is able to send ACK/NAK signal for each of the HARQ process blocks together with group ACK signal as a group response signal. In this case, instead of sending group NAK signal, it is able to send a group ACK signal and a response signal (i.e., ACK/NAK signal for configuration HARQ process block) for the configuration HARQ process block only. This is as god as the aforesaid implicit response scheme for the case that transmission success probability is high. On the contrary, it is apparent that the scheme for transmitting group NAK together can be named explicit group response scheme.

Figure 9:
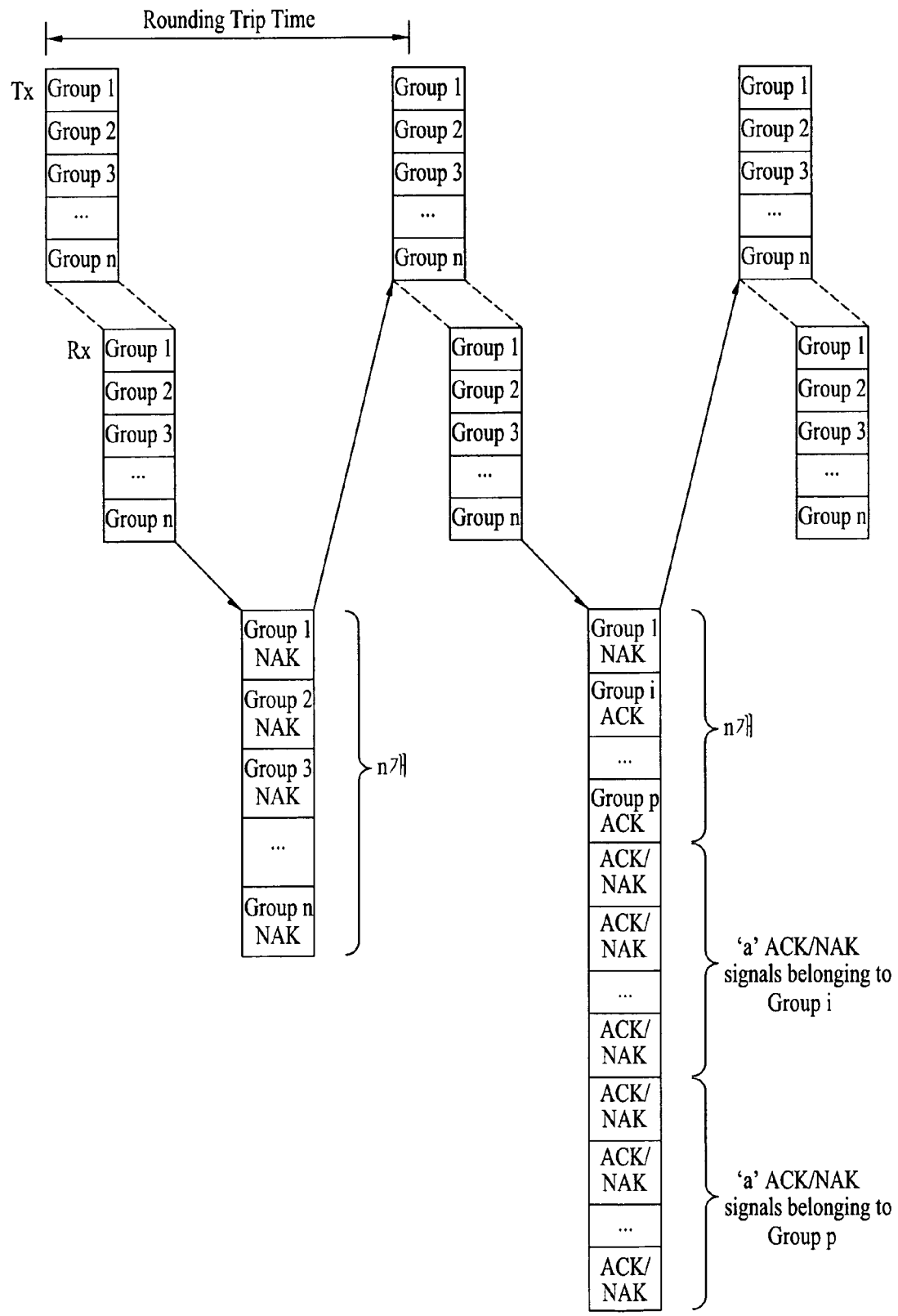
FIG. 9 is a diagram to describe transmission and reception of a response signal adopting an explicit group response scheme if it is decided that reception success probability of data transmitted in a communication system according to another embodiment of the present invention is low.
Figure 10:
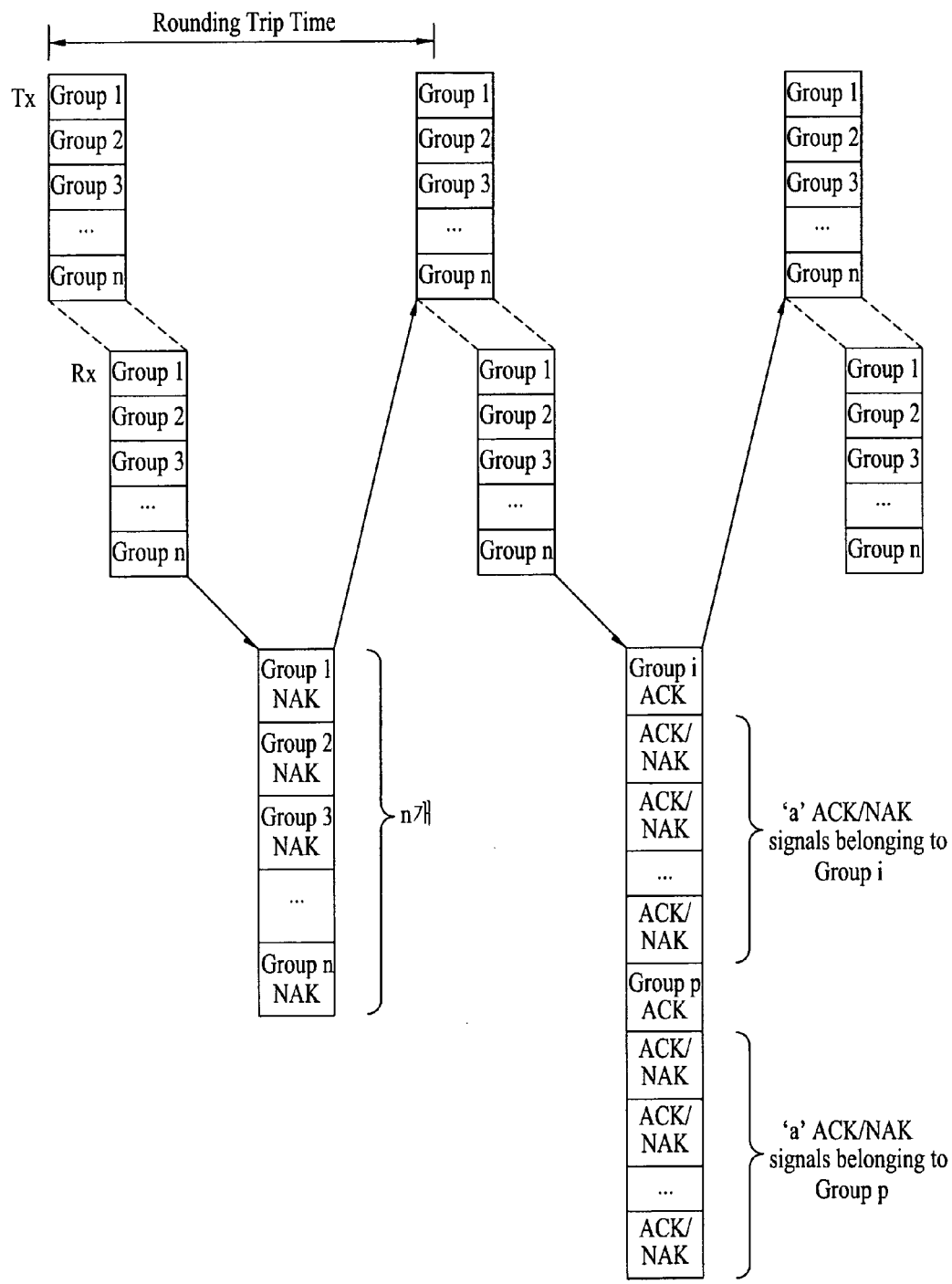
FIG. 10 is a diagram to describe transmission and reception of a response signal adopting an implicit group response scheme if it is decided that reception success probability of data transmitted in a communication system according to another embodiment of the present invention is low.

FIG. 9 and FIG. 10 are diagrams for a method of transmitting/receiving a response signal in case that reception success probability of data transmitted in a communication system according to one embodiment of the present invention is set low. It failure probability of transmission data is greater than success probability thereof, signal is sent by a scheme reverse to the former scheme described in FIG. 7 and FIG. 8. And, various items and assumptions proposed for the implementation of the present invention are identical to those described in FIG. 5 and FIG. 6.

FIG. 9 is a diagram to describe transmission and reception of a response signal adopting an explicit group response scheme if it is decided that reception success probability of data transmitted in a communication system according to another embodiment of the present invention is low.

In case that a transmitter transmits m HARQ process blocks, a receiver classifies the received HARQ process blocks into at least one group by referring to the aforesaid group classification reference and then checks a presence or non-presence of reception success/failure of the HARQ process blocks within the corresponding group per the group. Since CRC bits or parity bits are contained in each of the HARQ process blocks, it is able to perform error check.

Referring to FIG. 9, group NAK signals are transmitted as group response signals in entire groups in transmission of first data blocks but ACK is generated from HARQ process blocks belonging to $i^{th}$ and $p^{th}$ groups in transmission of second data blocks. In particular, if 'a' HARQ process blocks within the $i^{th}$ group fail in successful reception in the transmission of the second data blocks, group-i NAK signal is transmitted to a transmitter only. Yet, since any one of 'a' HARQ process blocks is successfully received, group-i ACK signal is transmitted to the transmitter and ACK/NAK signal for each of the 'a' HARQ process blocks is transmitted. In this case, the number of ACK/NACK information transmitted together with the group-i ACK signal is preferably set to 'a'. This is identically applied to the $p^{th}$ group. FIG. 9 depicts a case that explicit group response scheme is adopted. In case of applying implicit response scheme, group ACK of the group having ACK generation and ACK/NAK response signal of the configuration HARQ process block can be sent only.

FIG. 10 is a diagram to describe transmission and reception of a response signal adopting an implicit group response scheme if it is decided that reception success probability of data transmitted in a communication system according to another embodiment of the present invention is low. Referring to FIG. 10, if response signals of all HARQ process blocks within a corresponding group are NAK, it can be observed that group NAK, which is a group response signal, is not transmitted.

As mentioned in the foregoing description, a transmitter having received response signal transmits new HARQ process block for HARQ process block corresponding to group NAK signal.

In case of receiving group ACK signal, the transmitter checks response signal of HARQ process block, which is received together with the group ACK signal, configuring a corresponding group, sends HARQ process block relevant to a previously transmitted process block by the aforesaid HARQ operating scheme (IR or CC scheme) for the HARQ process block for which NAK signal has been sent, and transmits new HARQ process block for ACK signal. The transmitter and receiver carry out the above-described process unless data to be transmitted fails to exist.

In a communication system, if probability of success in data transmission is p, when m HARQ processes are simultaneously transmitted, the number of bits necessary to send a plurality of ACK/NAK signals by dividing them into k groups can be represented as Formula 1 or Formula 2.

Formula 1 represents the number ($N^p_{ACK/NAK\ explicit}$) of response signals necessary for explicit response signal scheme in which group NAK and group ACK simultaneously coexist. And, Formula 2 represents the number ($N^p_{ACK/NAK\ implicit}$) of response signals necessary for implicit response signal scheme in which group ACK is not transmitted when group NAK and group ACK simultaneously coexist.

$$N^P_{ACK/NAK\ explicit} = \left\{\left(p^{\frac{m}{k}} \times 1\right) + \left(1 - p^{\frac{m}{k}}\right) \times \left(\frac{m}{k} + 1\right)\right\}^k \quad [\text{Formula 1}]$$

$$N^P_{ACK/NAK\ implicit} = \left(p^{\frac{m}{k}}\right)^k + \left\{\left(1 - p^{\frac{m}{k}}\right)\left(\frac{m}{k} + 1\right)\right\} + \left\{\left(1 - p^{\frac{m}{k}}\right)\left(\frac{m}{k} + 1\right)\right\}^1 + \ldots + \left\{\left(1 - p^{\frac{m}{k}}\right)\left(\frac{m}{k} + 1\right)\right\}^k \quad [\text{Formula 2}]$$

$$= \left(p^{\frac{m}{k}}\right)^k + \frac{\left\{\left(1 - p^{\frac{m}{k}}\right)\left(\frac{m}{k} + 1\right)\right\}\left\{1 - \left\{\left(1 - p^{\frac{m}{k}}\right)\left(\frac{m}{k} + 1\right)\right\}^k\right\}}{1 - \left\{\left(1 - p^{\frac{m}{k}}\right)\left(\frac{m}{k} + 1\right)\right\}}$$

Likewise, In a communication system, if probability of success in data transmission is q, when m HARQ processes are simultaneously transmitted, the number of bits necessary to send a plurality of ACK/NAK signals by dividing them into k groups can be represented as Formula 3 or Formula 4.

Formula 3 represents the number ($N^q_{ACK/NAK\ explicit}$) of response signals necessary for explicit response signal scheme in which group NAK and group ACK simultaneously coexist. And, Formula 4 represents the number ($N^q_{ACK/NAK\ implicit}$) of response signals necessary for implicit response signal scheme in which group NAK is not transmitted when group NAK and group ACK simultaneously coexist.

$$N^q_{ACK/NAK\ explicit} = \left\{\left(q^{\frac{m}{k}} \times 1\right)\left(1 - q^{\frac{m}{k}}\right) \times \left(\frac{m}{k} + 1\right)\right\}^k \quad [\text{Formula 3}]$$

$$N^q_{ACK/NAK\ implicit} = \left(q^{\frac{m}{k}}\right)^k + \left\{\left(1 - q^{\frac{m}{k}}\right)\left(\frac{m}{k} + 1\right)\right\} + \left\{\left(1 - q^{\frac{m}{k}}\right)\left(\frac{m}{k} + 1\right)\right\}^1 + \ldots + \left\{\left(1 - q^{\frac{m}{k}}\right)\left(\frac{m}{k} + 1\right)\right\}^k \quad [\text{Formula 4}]$$

$$= \left(q^{\frac{m}{k}}\right)^k + \frac{\left\{\left(1 - q^{\frac{m}{k}}\right)\left(\frac{m}{k} + 1\right)\right\}\left\{1 - \left\{\left(1 - q^{\frac{m}{k}}\right)\left(\frac{m}{k} + 1\right)\right\}^k\right\}}{1 - \left\{\left(1 - q^{\frac{m}{k}}\right)\left(\frac{m}{k} + 1\right)\right\}}$$

Table 1 shows an average bit number of multiple ACK/NAK signals required when explicit response signal scheme is applied, in case that m HARQ process blocks and success (failure) probability p(q) of transmission data are given with a single group. Table 1 results from applying Formula 1 and Formula 2 (or Formula 3 and Formula 4) by varying m and p(q). The number of response signals for the related art m HARQ process blocks is equal to m.

TABLE 1

| | | # of simultaneously processed HARQ process blocks | | | | |
|---|---|---|---|---|---|---|
| | | 2 | 3 | 4 | 5 | 10 |
| P [transmission | 0.7 | 1.51 | 2.31 | 3.23 | 4.33 | 9.75 |
| success (failure) | 0.8 | 1.36 | 1.98 | 2.78 | 3.69 | 9.03 |
| probability] | 0.9 | 1.19 | 1.54 | 2.03 | 2.64 | 6.86 |
| | 0.99 | 1.02 | 1.06 | 1.12 | 1.20 | 1.86 |

Referring to Table 1, the higher a transmission success rate gets and the more the number of HARQ process blocks becomes, the less the average expected number of response signals becomes. To obtain an integer value necessary for resource allocation for response signal, ascent, round-off or descent is applicable to the value obtained from Table 1. Meanwhile, regarding a method of simultaneously transmitting/receiving response signals for a plurality of data blocks such as a plurality of HARQ process blocks proposed by one embodiment of the present invention, the present invention proposes a method of transmitting/receiving a response signal with an index of an index table which is a set of combinations of response signals for at least one or more data blocks unlike the group response signal scheme. This is explained in the following description.

Figure 11:
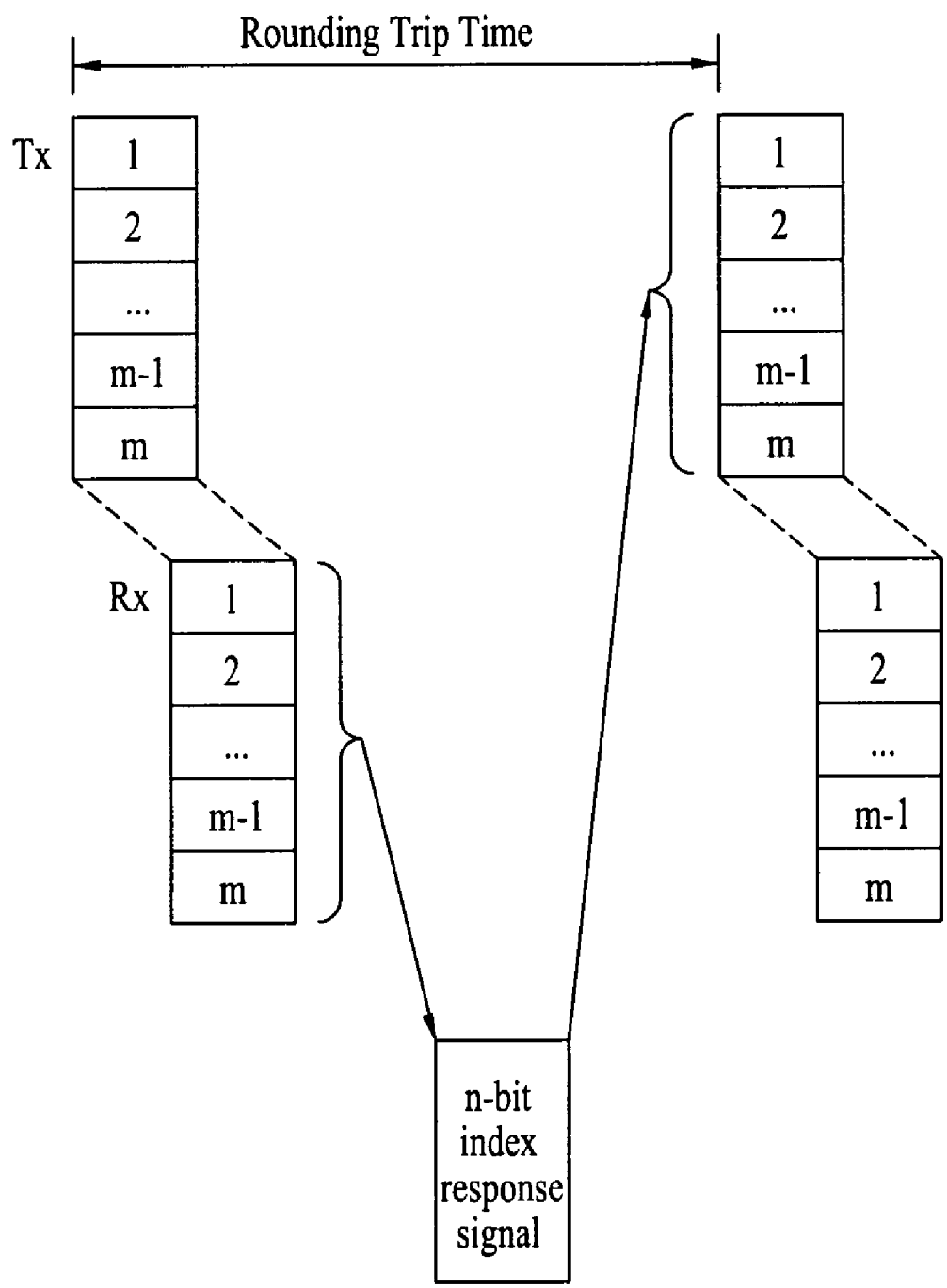
FIG. 11 is a diagram to describe a method of transmitting and receiving an index response signal according to another embodiment of the present invention.

FIG. 11 is a diagram to describe a method of transmitting and receiving an index response signal according to another embodiment of the present invention. As mentioned in the foregoing description, since systems use various channel coding schemes and various modulation schemes or transmit data blocks by varying sizes of the data blocks, generation probability of ACK/NACK of each of the received data blocks is different and ACK generation probability is raised. So, generation probabilities of generated combinations of ACK/NAK signals for m HARQ process blocks, which are simultaneously transmitted using stop-and-wait HARQ, become different from each other. In case that channel environment is good, even if NAK is generated from m process blocks in part, it is not mandatory to secure m radio resources. The reason why m-bit radio resources are secured is to prepare all cases of ACK and NAK signals of m HARQ process blocks. Although NAK is generated from HARQ process blocks in part, it is enough to make response to m HARQ process blocks with less radio resources without keeping securing m radio resources (e.g., m bits) for a case of rare generation probability. This is more effective in saving radio resources in case that transmitters connected to respective antennas in a multi-antenna system simultaneously transmit a plurality of HARQ process blocks. Generally, a user equipment receives resource information for response signal via control signal from a network. Yet, if allocation or reception fails due to data congestion or the like, the user equipment is able to transmit response signal by allocating minimum radio resources by itself.

For clear operation, in case of deciding that a channel environment is good for a predetermined time at least, a network or user equipment is able to transmit a control signal to make a request for response signal resource allocation scheme of an index table format proposed by the present invention from one side to the other side. Once receiving the control signal, a receiver raises a ratio of payload by optimizing a resource amount of control data by the index table format proposed by the present invention for the resource allocation for the response signal. The request control signal can be carried on system information or such a shared channel as a random access channel (RACH) or can be transmitted and received via a dedicated channel or a separate new channel.

The number of resources for response signal required in average according to a transmission success rate in m HARQ process blocks simultaneously transmitted can be represented as an expected value shown in Formula 5.

$$N^p_{ACK/NAK} = \{(p^m \times 1) + (1-p^m) \times (m)\}$$ [Formula 5]

In Formula 5, 'p' means a probability that transmission data can be successfully received by a receiver. And, 'm' means the number of HARQ process blocks simultaneously transmitted.

'$N^p_{ACK/NAK}$' is the number of average radio resource bits required for ACK/NAK response if transmission success probability is 'p' when m HARQ process blocks are simultaneously transmitted.

Table 2 shows the average bit number required for an expected response signal transmission in case of applying Formula 5 according to transmission success probability and the number of simultaneously transmitted HARQ process blocks.

TABLE 2

| | | # of simultaneously processed HARQ process blocks | | | | |
|---|---|---|---|---|---|---|
| | | 2 | 3 | 4 | 5 | 10 |
| P (transmission | 0.7 | 1.51 | 2.31 | 3.23 | 4.33 | 9.75 |
| success | 0.8 | 1.36 | 1.98 | 2.78 | 3.69 | 9.03 |
| probability) | 0.9 | 1.19 | 1.54 | 2.03 | 2.64 | 6.86 |
| | 0.99 | 1.02 | 1.06 | 1.12 | 1.20 | 1.86 |

Referring to Table 2, the higher a transmission success rate gets and the more the number of simultaneously processed HARQ process blocks becomes, the less the average expected number of response signals considerably becomes. To obtain a positive integer value necessary for resource allocation for response signal, ascent, round-off or descent is applicable to the value obtained from Table 2.

Particularly, in the present invention, a size of radio resource necessary for a receiver to transmit such a response signal as ACK/NAK for data such as HARQ process blocks simultaneously transmitted from a transmitter, as shown in Formula 5, can be represented as a function of a transmission success rate of the data and the number of data blocks such as HARQ process blocks.

According to another embodiment of the present invention, it is assumed that the number of radio resources required for response signal allocation is obtained by rounding off a value obtained from Table 2 according to the number of HARQ process blocks and a transmission success rate.

Subsequently, with the bit number found through the above step, a response table for representing response signal for HARQ process blocks more than the bit number is configured. If the found bit number is n, there are response table elements amounting to total $2^n$. Indexes are assigned to the elements in sequence from 0 to $2^n-1$. If response signals for HARQ process blocks are fully ACK or NAK, allocation is made to arbitrary indexes known to transmitter and receiver. For instance, it is assumed that allocation is made to index 0 and index ($2^n-1$) in case of full ACK or full NAK. Since the case of full ACK has a highest probability of generation, allocation is made. In case of full NAK, full NAK is transmitted for a case that all combinations are not represented due to an insufficient size of table, a case that combinations having low generation probability are not represented, and the like. Hence, data reliability can be enhanced.

Response signals to the rest of $(2^n-2)$ simultaneously HARQ process blocks are allocated. In this case, if combination of ACK/NAK signals for the HARQ process blocks does not exit in the response table, index number $(2^n-1)$, which corresponds to the case of full NAK, is transmitted. And, it is indicated that NAKs are generated from both of the transmitter and the receiver.

According to another embodiment of the present invention, proposed is a method of allocation is made to index 0 and index $2^n-1$ in case of full ACK or full NAK and allocating response signals for m HARQ process blocks to the rest of indexes.

Theoretically, if m HARQ process blocks are simultaneously operated, $2^m$ combinations of response signals are possible. Yet, an index table according to the response signal bit number (assumed as 'n') decided through Formula 5 proposed by an embodiment of the present invention includes $2^n$ elements only.

As can be observed from Table 2, if retransmission probability is low (i.e., transmission success probability is high) and if the number (m) of HARQ processes gets incremented higher, a value of 'n' is considerably decremented smaller than a value of 'm'. So, combinations of response signals for real HARQ process blocks may not be included as elements of the index table. Hence, an efficient configuration method is necessary.

As a transmission success probability 'p' is increased higher, 'n' gets considerably smaller than 'm' Yet, since 'p' is considerably large, it is estimated that a channel environment will be good. Generation probability of NAK response signal is reduced and probability of at least two simultaneous NAK generations gets further reduced. Hence, in an index table remaining by excluding a case of full ACK or full NAK previously allocated in the index table, allocation is preferentially carried out on a case that a single response signal is NAK only. In this case, for combinations having the same generation probability, allocation is carried out by setting a random order or can be randomly decided. For example, in case that a response signal for a single block is NAK among m HARQ process blocks, m combinations are possible. If the number $(2^n-2)$ of usable index tables is greater than m, allocation can be made to all m configurations, which does not cause any problem. Yet, if $2^n-2$ is smaller than m, it means a case of having the same processing priority. So, the allocation can be carried out in a manner that allocation is carried out on a case of NAK from a last process blocks.

In the above-explained index table using response method, there can exist several tables fixed by pre-decision between a user equipment and a network in a system according to transmission success probability p or the tables can be notified to a user equipment from a network via system information and the like.

In the latter case, an index table is modified based on a channel environment in a predetermined interval and is usable between a network and a user equipment. In particular, ACK and NAK distribution ratios of response signals in a predetermined time or interval from a transmitter to a receiver are accumulated and transmission success probability is then decided based on the accumulated ratios. The transmission success probability is decided based on CINR (carrier to interference and noise ratio) value of a specific channel or a value of RSSI (received signal strength indicator). The transmission success probability is decided in a manner that a receiver analyzes a channel environment via pilot signal of a transmitter and the like.

If a network transmits index table information suitable for a user equipment via system information or the like to the user equipment according to the decided transmission success probability or transmits control information instructing the decided transmission success probability to the user equipment, a method of using an index table, which is loaded in the user equipment and identical to that used by the network, is possible.

Tables 3 to 10 show embodiments of the present invention for configuration of index table by the method of deciding the response signal number decided according to Formula 5 and Table 2 using round-off by changing retransmission probability and the number of simultaneously processed HARQ process blocks in multi-antenna system.

Table 3 shows an example of an index table in case that two HARQ process blocks are used if a retransmission probability is 30%, i.e., if a transmission success probability is 0.7. In this case, since the response signal number decided by round-off is equal to the number of HARQ process blocks, an index table can have all possible combinations of response signals.

Receiver transmits index information having combination suitable for a response signal of a current process block in the index table to a transmitter via 2-bit response signal index information. As mentioned in the foregoing description, in Table 3, 'stream' means each data stream configuring a single data block transmitted to a user or may mean data streams transmitted to a plurality of users, respectively.

The stream may also mean each independent error-detectible data stream that is simultaneously transmitted in a communication system having a plurality of transmitting antennas. In the following embodiments, the stream means each HARQ process block transmitted from each of m transmitting antennas. And, the same meaning is applicable to the following tables.

TABLE 3

| Index | Stream 1 | Stream 2 |
|---|---|---|
| 0 | ACK | ACK |
| 1 | ACK | NAK |
| 2 | NAK | ACK |
| 3 | NAK | NAK |

Table 4 represents the index response signal scheme shown in Table 3 in viewpoint of group ACK/NAK response signal scheme. In Table 4, G_ACK means a group ACK and G_NAK means a group NAK. In case of index 0, it corresponds to a case that all data streams have ACK generations. So, it may be regarded as a case that group ACK has been generated. In the following tables, the same expressions and meanings are effective.

TABLE 4

| Index | G_ACK/G_NAK | Stream 1 | Stream 2 |
|---|---|---|---|
| 0 | G_ACK | ACK | ACK |
| 1 | G_NAK | ACK | NAK |
| 2 | G_NAK | NAK | ACK |
| 3 | G_NAK | NAK | NAK |

Table 5 shows possible combinations of response signals for whole data streams and combination generation probabilities if three data streams (i.e., HARQ process blocks) are simultaneously processed. Total combination number is 8 equal to $2^3$.

TABLE 5

| Index | Stream 1 | Stream 2 | Stream 3 | Generation Probability |
|---|---|---|---|---|
| 0 | ACK | ACK | ACK | 0.343 |
| 1 | ACK | ACK | NAK | 0.147 |
| 2 | ACK | NAK | ACK | 0.147 |
| 3 | ACK | NAK | NAK | 0.063 |
| 4 | NAK | ACK | ACK | 0.147 |
| 5 | NAK | ACK | NAK | 0.063 |
| 6 | NAK | NAK | ACK | 0.063 |
| 7 | NAK | NAK | NAK | 0.027 |

Table 6 shows the index response signal scheme represented as Table 5 in viewpoint of group ACK/NAK response signal scheme.

TABLE 6

| Index | G_ACK/ G_NAK | Stream 1 | Stream 2 | Stream 3 | Generation Probability |
|---|---|---|---|---|---|
| 0 | G_ACK | ACK | ACK | ACK | 0.343 |
| 1 | G_NAK | ACK | ACK | NAK | 0.147 |
| 2 | G_NAK | ACK | NAK | ACK | 0.147 |
| 3 | G_NAK | ACK | NAK | NAK | 0.063 |
| 4 | G_NAK | NAK | ACK | ACK | 0.147 |
| 5 | G_NAK | NAK | ACK | NAK | 0.063 |
| 6 | G_NAK | NAK | NAK | ACK | 0.063 |
| 7 | G_NAK | NAK | NAK | NAK | 0.027 |

On the other hand, Table 7 shows an example of an index table in case that three data streams (i.e., HARQ process blocks) are simultaneously used if retransmission probability is 30%, i.e., if transmission success probability p is 0.7. This corresponds to a case that a value (i.e., 4) decided by rounding off a value obtained via Formula 5 is smaller than the number of simultaneously processed HARQ process blocks. So, a table is configured according to the aforesaid present invention. First of all, a case of full ACK is allocated to an index 0 and a case of full NAK is allocated to an index 3. Generation probability of a case that a single NAK is generated from the rest of combinations becomes highest. In this case, since the rest two is insufficient to represent three kinds that one of three HARQ process blocks corresponds to NAK, table is configured as shown in Table 7 or can be configured differently.

TABLE 7

| Index | Stream 1 | Stream 2 | Stream 3 |
|---|---|---|---|
| 0 | ACK | ACK | ACK |
| 1 | ACK | ACK | NAK |
| 2 | NAK | ACK | ACK |
| 3 | NAK | NAK | NAK |

Table 8 shows the index response signal scheme represented in Table 7 in viewpoint of group ACK/NAK response signal scheme.

TABLE 8

| Index | G_ACK/ G_NAK | Stream 1 | Stream 2 | Stream 3 |
|---|---|---|---|---|
| 0 | G_ACK | ACK | ACK | ACK |
| 1 | G_NAK | ACK | ACK | NAK |
| 2 | G_NAK | NAK | ACK | ACK |
| 3 | G_NAK | NAK | NAK | NAK |

*120 Table 9 shows an example of an index table in case that four HARQ process blocks are simultaneously processed if retransmission probability is 30%, i.e., if transmission success probability p is 0.7. This corresponds to a case that a response signal number decided by round-off is smaller than the number of HARQ process blocks. So, a table is configured according to the aforesaid present invention. First of all, a case of full ACK is allocated to an index 0 and a case of full NAK is allocated to an index 7. Cases that a single process block response signal is NAK are allocated to indexes 1 to 4, respectively. Cass that two process block response signals are NAK are allocated to index 5 and index 6, respectively. Yet, it is unable to represent all cases for combinations thereof. Since channel characteristic in the course of transmission is bursty, it is able to consider a scheme that ACK and NAK signals are consecutively arranged, respectively.

TABLE 9

| Index | Stream 1 | Stream 2 | Stream 3 | Stream 4 |
|---|---|---|---|---|
| 0 | ACK | ACK | ACK | ACK |
| 1 | ACK | ACK | ACK | NAK |
| 2 | ACK | ACK | NAK | ACK |
| 3 | ACK | NAK | ACK | ACK |
| 4 | NAK | ACK | ACK | ACK |
| 5 | ACK | ACK | NAK | NAK |
| 6 | NAK | NAK | ACK | ACK |
| 7 | NAK | NAK | NAK | NAK |

Table 10 shows the index response signal scheme represented in Table 9 in viewpoint of group ACK/NAK response signal scheme.

TABLE 10

| Index | G_ACK/G_NAK | Stream 1 | Stream 2 | Stream 3 | Stream 4 |
|---|---|---|---|---|---|
| 0 | G_ACK | ACK | ACK | ACK | ACK |
| 1 | G_NAK | ACK | ACK | ACK | NAK |
| 2 | G_NAK | ACK | ACK | NAK | ACK |
| 3 | G_NAK | ACK | NAK | ACK | ACK |
| 4 | G_NAK | NAK | ACK | ACK | ACK |
| 5 | G_NAK | ACK | ACK | NAK | NAK |
| 6 | G_NAK | NAK | NAK | ACK | ACK |
| 7 | G_NAK | NAK | NAK | NAK | NAK |

Table 11 shows an example of an index table in case that four HARQ process blocks are simultaneously processed if retransmission probability is 20%, i.e., if transmission success probability p is 0.8. The following is as good as that of Table 9.

TABLE 11

| Index | Stream 1 | Stream 2 | Stream 3 | Stream 4 |
|---|---|---|---|---|
| 0 | ACK | ACK | ACK | ACK |
| 1 | ACK | ACK | ACK | NAK |
| 2 | ACK | ACK | NAK | ACK |
| 3 | ACK | NAK | ACK | ACK |
| 4 | NAK | ACK | ACK | ACK |
| 5 | ACK | ACK | NAK | NAK |
| 6 | NAK | NAK | ACK | ACK |
| 7 | NAK | NAK | NAK | NAK |

Table 12 shows the index response signal scheme represented in Table 11 in viewpoint of group ACK/NAK response signal scheme.

TABLE 12

| Index | G_ACK/G_NAK | Stream 1 | Stream 2 | Stream 3 | Stream 4 |
|---|---|---|---|---|---|
| 0 | G_ACK | ACK | ACK | ACK | ACK |
| 1 | G_NAK | ACK | ACK | ACK | NAK |
| 2 | G_NAK | ACK | ACK | NAK | ACK |
| 3 | G_NAK | ACK | NAK | ACK | ACK |
| 4 | G_NAK | NAK | ACK | ACK | ACK |
| 5 | G_NAK | ACK | ACK | NAK | NAK |
| 6 | G_NAK | NAK | NAK | ACK | ACK |
| 7 | G_NAK | NAK | NAK | NAK | NAK |

Table 13 shows an example of an index table in case that four HARQ process blocks are simultaneously processed if retransmission probability is 10%, i.e., if transmission success probability p is 0.9. It is estimated that a channel environment is good. This corresponds to a case that the response signal number decided by round-off is smaller than the number of HARQ process blocks by 2. So, a table is configured according to the aforesaid present invention as well. First of all, a case of full ACK is allocated to an index 0 and a case of full NAK is allocated to an index 3. Cases that a single process block response signal is NAK are allocated to index 1 and index 2, respectively. Yet, it is unable to represent all cases for combinations thereof. Hence, arrangement can be carried out as Table 5.

TABLE 13

| Index | Stream 1 | Stream 2 | Stream 3 | Stream 4 |
|---|---|---|---|---|
| 0 | ACK | ACK | ACK | ACK |
| 1 | ACK | ACK | ACK | NAK |
| 2 | NAK | NAK | ACK | ACK |
| 3 | NAK | NAK | NAK | NAK |

Table 14 shows the index response signal scheme represented in Table 13 in viewpoint of group ACK/NAK response signal scheme.

TABLE 14

| Index | G_ACK/G_NAK | Stream 1 | Stream 2 | Stream 3 | Stream 4 |
|---|---|---|---|---|---|
| 0 | G_ACK | ACK | ACK | ACK | ACK |
| 1 | G_NAK | ACK | ACK | ACK | NAK |
| 2 | G_NAK | NAK | NAK | ACK | ACK |
| 3 | G_NAK | NAK | NAK | NAK | NAK |

The present invention is applicable to a case that transmission failure probability is high due to poor channel environment as well as a case that a channel environment is good due to high transmission success probability. Since probability of NAK signal generation is high in case of the poor channel environment to the contrary of the good channel environment, the number of response signals necessary according to the number of m HARQ processes can be represented as Formula 6 with reference to probability q in transmission failure.

$$N^q_{ACK/NAK} = \{(q^m \times 1) + (1 - q^m) \times (m)\} \quad \text{[Formula 6]}$$

In Formula 6, 'q' means a probability that transmission data is unsuccessfully received by a receiver. And, 'm' means the number of simultaneously transmitted HARQ blocks.

"$N^q_{ACK/NAK}$" is the number of expected radio resource bits necessary for ACK/NAK response if transmission failure probability is q in case of simultaneous transmission of m HARQ process blocks.

Table 15 shows the response signal bit number in case that transmission failure probability q and the simultaneously-processed HARQ process block number are applied to formula 6.

TABLE 15

| | | # of simultaneously processed HARQ process blocks | | | | |
|---|---|---|---|---|---|---|
| | | 2 | 3 | 4 | 5 | 10 |
| q (probability of retransmission occurrence) | 0.7 | 1.51 | 2.31 | 3.23 | 4.33 | 9.75 |
| | 0.8 | 1.36 | 1.98 | 2.78 | 3.69 | 9.03 |
| | 0.9 | 1.19 | 1.54 | 2.03 | 2.64 | 6.86 |
| | 0.99 | 1.02 | 1.06 | 1.12 | 1.20 | 1.86 |

It can be observed that Table 15 is identical to Table 2.

Table 16 shows an example of an index table in case that four HARQ process blocks are simultaneously processed if retransmission probability is 80%, i.e., if failure probability q is 0.8. This corresponds to a case that a response signal number decided by round-off is smaller than the number of HARQ process blocks. So, a table is configured according to the aforesaid present invention. First of all, since retransmission probability is high, a case of full NAK is allocated to an index 0 and a case of full ACK is allocated to an index 7. Cases that a single process block response signal is ACK are allocated to indexes 1 to 4, respectively. Cass that two process block response signals are ACK are allocated to index 5 and index 6, respectively. Yet, it is unable to represent all cases for combinations thereof. Since channel characteristic in the course of transmission is bursty, it is able to consider a scheme that ACK and NAK signals are consecutively arranged, respectively. Alternatively, in order to prevent an index table from increasing, it is able to use the same index table in case that a channel environment is good or poor. Table 16 shows a configuration of an index table in case that index table is discriminated by discriminating a good channel environment and a poor channel environment from each other to represent the present invention in various ways in a manner of taking a specific reference as a boundary.

TABLE 16

| Index | Stream 1 | Stream 2 | Stream 3 | Stream 4 |
|---|---|---|---|---|
| 0 | NAK | NAK | NAK | NAK |
| 1 | NAK | NAK | NAK | ACK |
| 2 | NAK | NAK | ACK | NAK |
| 3 | NAK | ACK | NAK | NAK |
| 4 | NAK | NAK | NAK | NAK |
| 5 | NAK | NAK | ACK | ACK |
| 6 | ACK | ACK | NAK | NAK |
| 7 | ACK | ACK | ACK | ACK |

Table 17 shows the index response signal scheme represented in Table 16 in viewpoint of group ACK/NAK response signal scheme.

TABLE 17

| Index | G_ACK/G_NAK | Stream 1 | Stream 2 | Stream 3 | Stream 4 |
|---|---|---|---|---|---|
| 0 | G_NAK | NAK | NAK | NAK | NAK |
| 1 | G_ACK | NAK | NAK | NAK | ACK |
| 2 | G_ACK | NAK | NAK | ACK | NAK |
| 3 | G_ACK | NAK | ACK | NAK | NAK |
| 4 | G_ACK | NAK | NAK | NAK | NAK |
| 5 | G_ACK | NAK | NAK | ACK | ACK |

TABLE 17-continued

| Index | G_ACK/G_NAK | Stream 1 | Stream 2 | Stream 3 | Stream 4 |
|---|---|---|---|---|---|
| 6 | G_ACK | ACK | ACK | NAK | NAK |
| 7 | G_ACK | ACK | ACK | ACK | ACK |

Thus, it is apparent that the index table can be configured like the case that a channel environment is good by changing failure probability and the number of HARQ process blocks.

The above-described embodiments of the present invention relate to the case of transmitting data using multi-antenna and are applicable to any cases including a case of transmitting different data blocks via the multi-antenna and a case that the same data block is transmitted for diversity.

The embodiments of the present invention are applicable to other ARQ schemes as well as stop-and-wait ARQ scheme. In the following description, a case of applying the present invention to continuous ARQ is explained in the first place. In go-back-N ARQ scheme among continuous ARQ schemes, a transmitter gives data blocks amounting to a specific window size and then transmits them continuously. In case of detecting errors from the received data blocks, a receiver transmits a sequence number of the erroneous data block to the transmitter together with NAK signal. The transmitter having received NAK retransmits frames amounting to the window size from the data block corresponding to the sequence number received together with the NAK to the receiver. Unlike go-back-N ARQ scheme or stop-and-wait ARQ, next data blocks keep being transmitted until NAK response signal is received instead of waiting for a response signal after transmission of a single data block. So, it is unnecessary that the number of response signals is as many as that required for stop-and-wait ARQ. In case that the scheme is combined with a multi-antenna mode, when ACK or NAK response signal is transmitted for a data block at each antenna, radio resources for response signals need to be minimized. And, in case that appropriate response signal resources are not allocated by a network, it is necessary to secure minimum response signal radio resources. Hence, the application of the present invention according to retransmission probability is possible as well. This is applicable to selective-repeat ARQ that is another scheme of continuous ARQ. In selective-repeat ARQ, a transmitter retransmits data block corresponding to NAK only unlike go-back-n ARQ in which a transmitter continuously retransmits data blocks from the data block of which NAK has been received. Hence, the present invention is applicable for optimization and minimization of response signals like go-back-n ARQ.

In order to maximize transmission efficiency, the present invention is applicable to adaptive ARQ scheme which is able to dynamically modify a length of data block to be transmitted. In adaptive ARQ scheme, in case that a data block retransmission request rate from a transmitter is big due to high error occurrence rate, a block is transmitted by shortening a length of the block. In case that a data block retransmission request rate from a transmitter is small, a block is transmitted by elongating a length of the block. Error occurrence rate of a channel of a transmitter is detected and then notified to a transmitter. The transmitter decides a most suitable length of data block according to this information and then transmits the corresponding data block. When adaptive ARQ is used by being combined with N-channel stop-and-wait HARQ in multi-antenna system or continuous ARQ, the present invention is applicable for resource security of response signals. In particular, when a plurality of HARQ process blocks are transmitted via antennas of multi-antenna, respectively, the present invention is applicable to resource allocation of response signal to data blocks according to retransmission probability. Thus, the response signal transmitting and receiving methods according to the embodiments of the present invention are explained so far.

In the following description, described are embodiments of applying the response signal transmitting and receiving methods according to the embodiments of the present invention to a resource allocating method in time and frequency domains of IEEE 802.16e system that is a sort of multi-carrier system.

The following embodiments of the present invention relate to a method of applying a response signal to HARQ process block to a response signal to HARQ process block from uplink.

Once a user equipment transmits HARQ process block via uplink, a network processes the received data and then transmits ACK/NAK signal as a response signal to the data to the user equipment in downlink. In this case, as mentioned in the foregoing description, the network is able to allocate response signal resources amounting to the number of the simultaneously processed data blocks. Alternatively, the network allocates a resource for the group response signal or the index response signal proposed by the embodiments of the present invention and then transmits a position of the allocated resource and a variable size of the allocated resource as control information to the user equipment. In the following embodiment, a group response signal scheme is adopted using response signal ACK/NAK to indicate whether uplink HARQ process block is successfully received, in which DL_HARQ_ACK_IE of DL-MAP is used.

Figure 4:
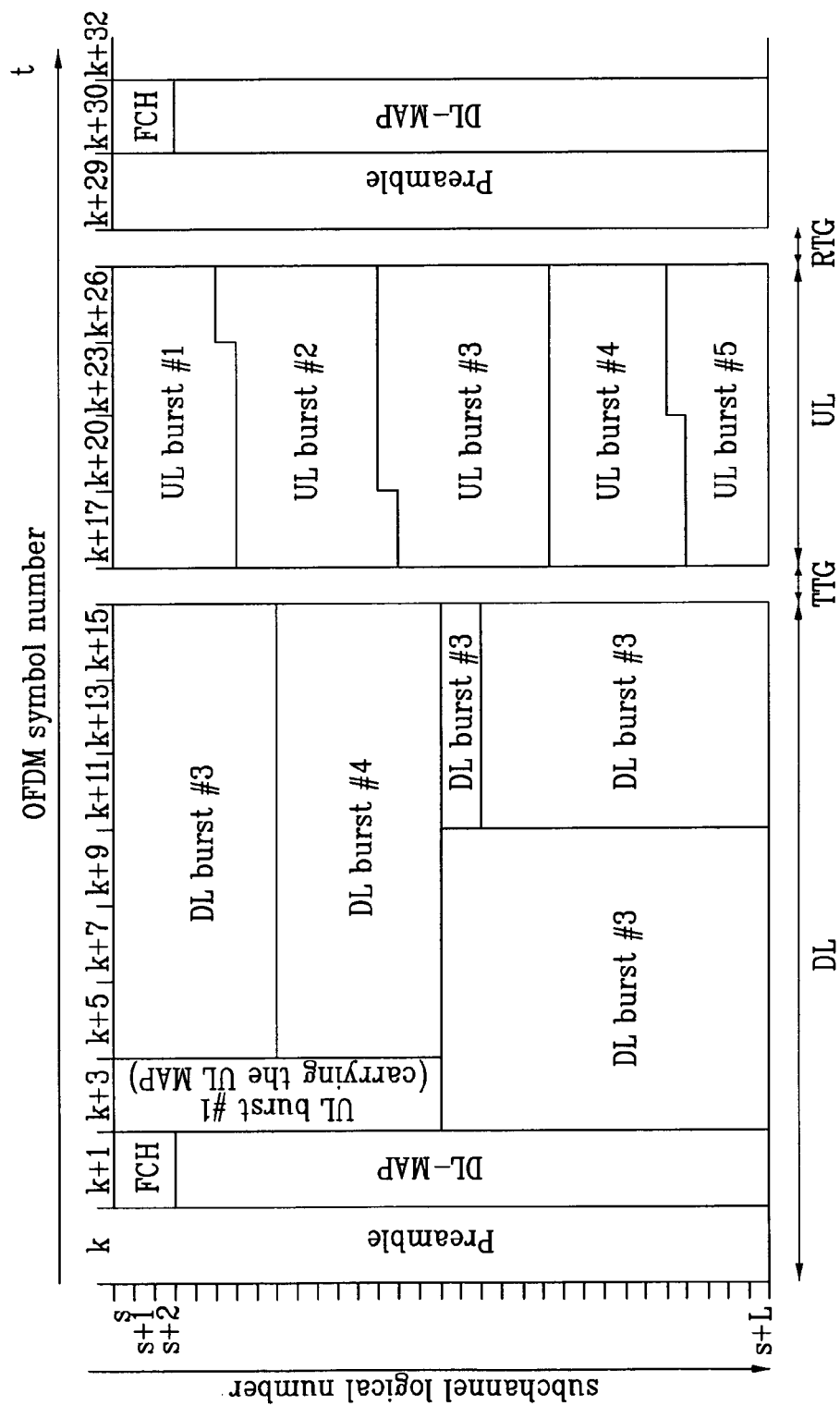
FIG. 4 is a diagram for a resource allocating method in time and frequency domains of IEEE 802.16e system as a kind of a multi-carrier system.

Group response signal proposed by the present invention is applicable to a downlink response signal of a single antenna system or a vertical multi-antenna system. The vertical multi-antenna system means that a single HARQ process block is transmitted or received via multiple antennas. In this case, a single response signal is necessary only, which can be represented as a single group signal. In particular, ACK indicating confirmation is represented as a group ACK signal and NAK indicating disconfirmation is represented as a group NAK signal. This group response signal can be transmitted using a bitmap. In particular, a response signal is transmitted using DL HARQ ACK IE within DL MAP as mentioned in FIG. 4.

DL_HARQ_ACK_IE

DL_HARQ_ACK_IE is an information element (IE) used in transmitting a response signal instructing a presence or non-presence of successful reception of uplink HARQ applied process block in a base station. And, it is configured as follows.

TABLE 18

| Syntax | Size (bit) | Notes |
|---|---|---|
| HARQ_ACK_IE { | | |
| Extened-2 DIUC | 4 | HARQ_ACK_IE( ) = 0x08 |
| Length | 8 | Length of byte unit |
| Bitmap | variable | Bitmap size decided by length field |
| } | | |

Bitmap shown in Table 18 contains HARQ ACK information for uplink HARQ process blocks. Size of bitmap should be equal to or greater than the number of HARQ process blocks. Each byte carries response signals amounting to maximum 8 bytes sequenced from a least significant bit (smallest index of ACK channel) to a most significant bit. If the corresponding HARQ process block is successfully received, assume that a confirmation bit corresponding to a response signal is 0 (ACK). Otherwise, assume that a confirmation bit is 1 (NAK). Bit position in bitmap is decided by a sequence of HARQ process blocks with UL-MAP.

Frame offset 'j' between uplink HARQ process block and HARQ ACK-bitmap corresponding to a so-called response signal to the uplink HARQ process block is specified by HARQ_ACK_Delay_for UL Burst field within DCD message. For instance, when MS transmits HARQ-enabled burst in a frame i, if the burst is $n^{th}$ HARQ-enabled burst in MAP, the MS should receive HARQ ACK at $n^{th}$ bit of BITMAP sent in frame (i+j) by BS.

Response signal for horizontal multi-antenna or a system of a plurality of HARQ process blocks can be transmitted in a manner of transmitting group response signal and response signal for each of the HARQ process blocks if necessary. Horizontal multi-antenna system means that a plurality of separate HARQ process blocks are transmitted via a plurality of antennas and differs from the vertical multi-antenna system.

For the received response signals, a base station is able to classify a plurality of HARQ process blocks, as proposed in FIGS. 5 to 8, into at least one or more groups. And, the base station just sends a group response signal for the corresponding group or can send response signals for the HARQ process blocks belonging to the corresponding group as well. Thus, unlike the single antenna system or the vertical multi-antenna system, a resource allocation amount necessary for response signal is not fixed but variable. This variable resource allocation can be indicated through length information on bitmap of the DL_HARQ_ACK_IE.

In case that transmission is carried out using DL_HARQ_ACK_IE, HARQ process block response signal for several users is carried by a predetermined transmission unit. So, a transmitter corresponding to each of the users searches for a response signal for the HARQ process block having been sent by itself, after having examined a bitmap corresponding to a channel that substantially carries a response signal using DL_MAP of the received frame. A method, in which a group response signal for HARQ process block is represented as a bitmap and then transmitted, proposed by the present embodiment can be classified into the following embodiments. In the following embodiments, a single group is allocated to 'n' users and at least one or more HARQ process blocks are transmitted per the group. It is to be understood that at least one group, to which at least one or more HARQ process blocks are allocated, can be allocated to every 'n' users. And, the present embodiments follow the explicit group response signal scheme, in which group ACK signal is transmitted only when each HARQ process block belonging to a group is fully and successfully received without sending ACK/NAK signal for each of the configuration HARQ process blocks if retransmission probability is smaller than a first threshold, as shown in FIG. 7. And, it is apparent to those skilled in the art that the following embodiments are applicable to the implicit group response scheme and the implicit or explicit group response scheme in case that retransmission probability is greater than a second threshold.

Figure 12:
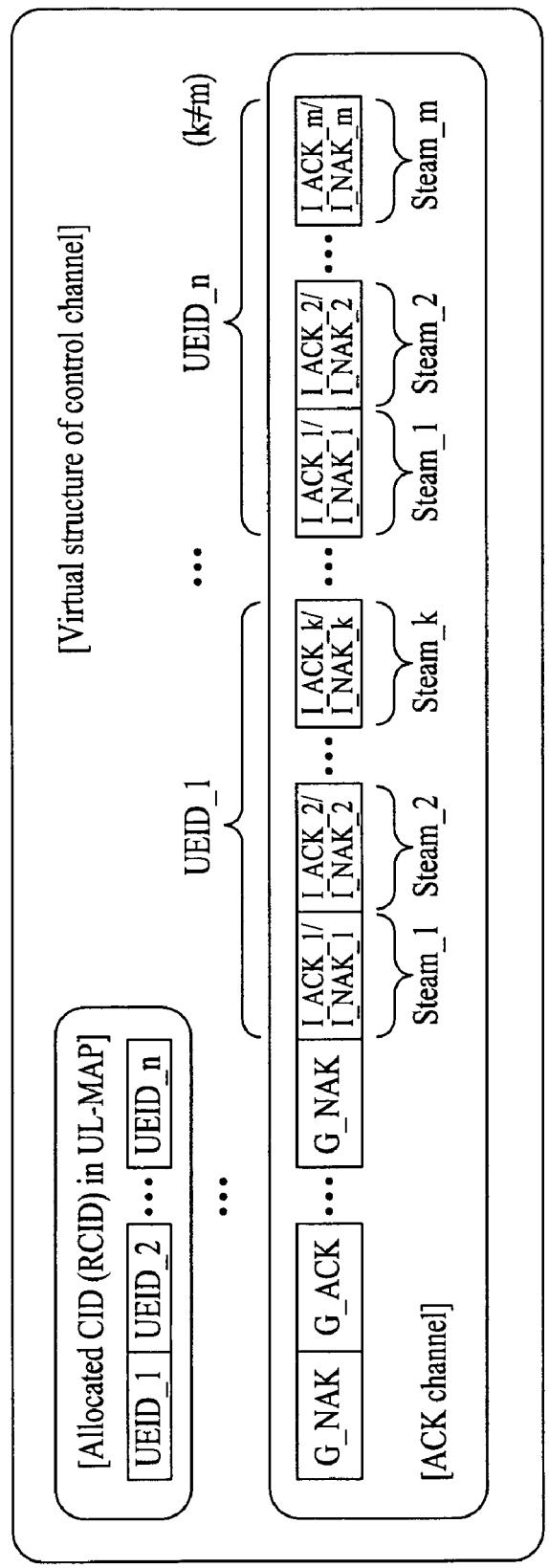
FIG. 12 is a diagram to describe a scheme for transmitting a group response signal in a bitmap format according to one embodiment of the present invention.

FIG. 12 is a diagram for a scheme of transmitting a group response signal in a bitmap format according to one embodiment of the present invention.

As mentioned in the foregoing description, UL-MAP message defines usages of bursts allocated to an uplink interval and the like and allocates usage authority for uplink channel. In particular, the UL-MAP message defines instructions for uplink bursts using continuous information elements that define instructions for uplink interval and also defines instructions for uplink resources allocated by block units of OFDM symbol and subchannel. Information element for UL-MAP specifies band allocation information for uplink.

Hence, in the UL-MAP message, resource allocation informations on HARQ process blocks transmitted by 'n' users are represented per such used identification information (UE ID) as CID and resource allocation information on at least one or more HARQ process blocks allocated per user. By referring to information on a sequence of uplink HARQ process blocks, which are transmitted per the user, in the UL-MAP message, bit position of group response signal for downlink HARQ process blocks and/or bit position of each response signal in the bitmap is decided. If HARQ process blocks, in which user identification information (UE ID) is allocated to each user within transmission unit resource, are allocated in order of the user identification information (UE ID), it is able to obtain sequence information on the user identification information (UE ID) through the process for obtaining information on a sequence of the uplink HARQ process blocks. In accordance with the user sequence information and the uplink HARQ process block sequence information obtained through the above process, group response signal and/or response signals for HARQ process blocks within each group are allocated to the bitmap of DL_HARQ_ACK_IE. The response signal allocation scheme in the bitmap according to the embodiment proposed in FIG. 12 is explained as follows.

Figure 2:
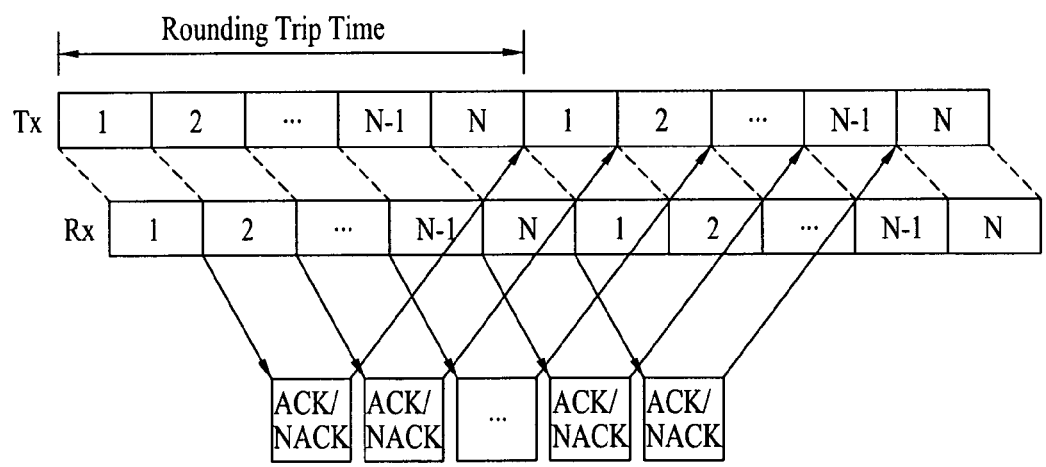
FIG. 2 is a diagram to explain a basic operation of N-channel stop-and-wait HARQ scheme according to a related art.
Figure 3:
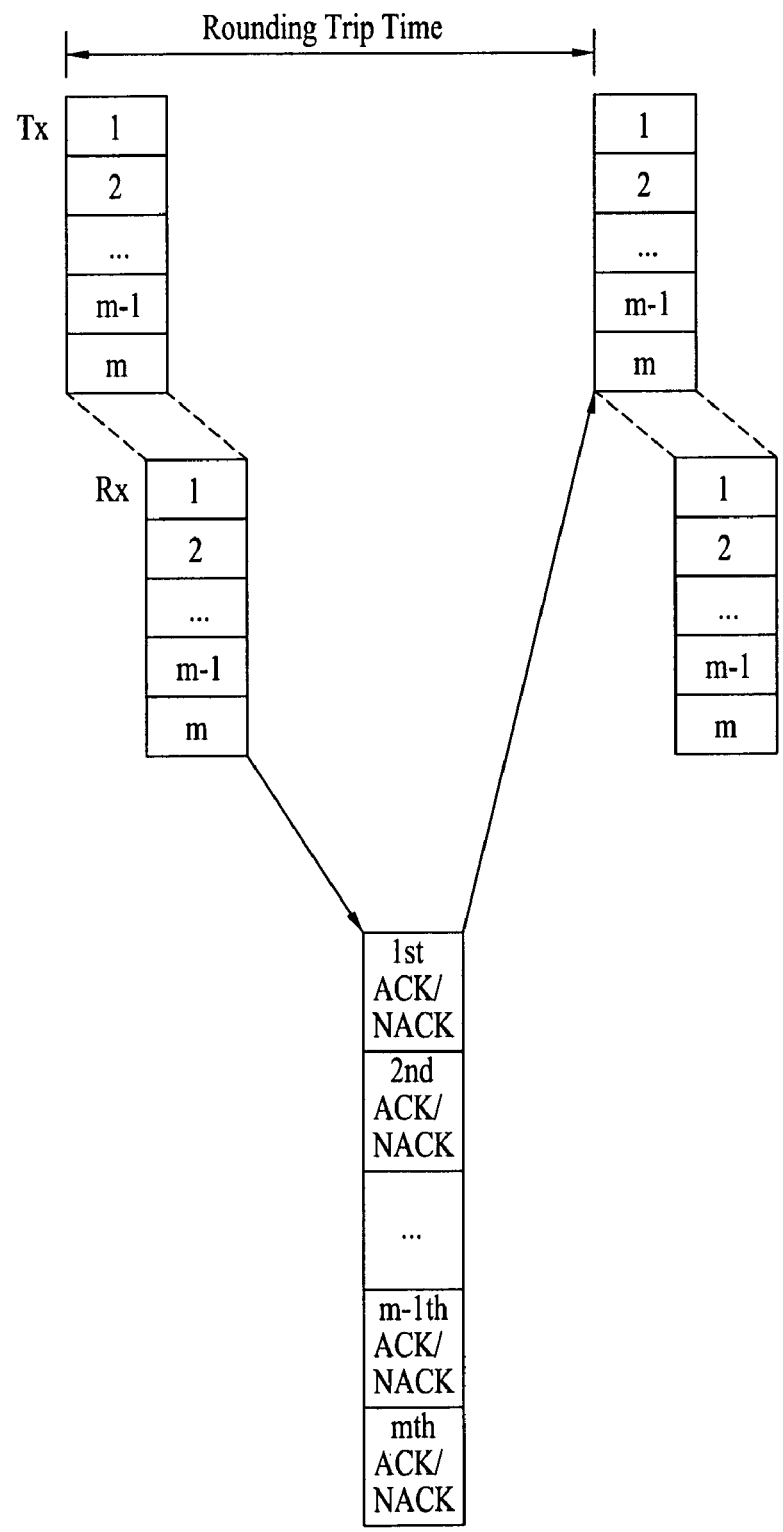
FIG. 3 is a diagram to explain an operation in case of transmitting a plurality of HARQ process blocks.

First of all, a group response signal allocated to each user is allocated to a bitmap in order of user identification information (UE ID). In the present embodiment, total 'n' bits are preferentially allocated on the assumption that there are total 'n' users. Subsequently, in case that HARQ process blocks belonging to the corresponding group are successfully received per the group, response signals for the configuration HARQ process blocks are not sent. In case that any one of the HARQ process blocks is not successfully received, a response signal for each of the whole HARQ process blocks belonging to the corresponding group is transmitted. In the embodiment shown in FIG. 12, bit allocation is carried out on a response signal for each of the HARQ process blocks per the group of the user, in which group NAK is generated, in order of user identification information (UE ID). The group response signal is represented as G_ACK_UEID corresponding to a group ACK response signal or G_NAK_UEID corresponding to a group NAK signal. Response signal to HARQ process blocks belonging to each group is represented as I_ACK corresponding to ACK response signal or I_NAK corresponding to NAK response signal. FIG. 2 depicts a case that NAK is generated from at least one HARQ process block per a user among uplink HARQ process blocks transmitted by a user when UE ID is 1 or n. So, G_NAK_1 (1 is allocated as a bit value), which is a group response signal value of the user of UE ID 1, is allocated as a group response signal in bitmap allocation to a bitmap. In case of users having UE IDs 2 to (n−1), G_ACK_2, . . . , G_ACK (n−1) (0 is allocated to each bit value) are allocated to the bitmap.

Subsequently, G_NAK_n is allocated for a user of which UE_ID is n. Individual response signals for HARQ process blocks belonging to the group having group NAK generated are allocated to the bitmap. In particular, a shown in FIG. 12, ACK/NAK signals for total 'k' HARQ process blocks of a group corresponding to user identification information 1, in which group NAK is generated, are allocated to the bitmap in allocation order in UL-MAP of HARQ process block ID within the corresponding group and also allocates ACK/NAK signals for total m (k≠m or K=m) HARQ process blocks of a group corresponding to user identification information n to the bitmap in allocation order in UL-MAP of HARQ process block ID within the group. Thus, in the above description, the group response signal transmitting method in a bitmap format according to one embodiment of the present invention is explained with reference to FIG. 12.

Figure 13:
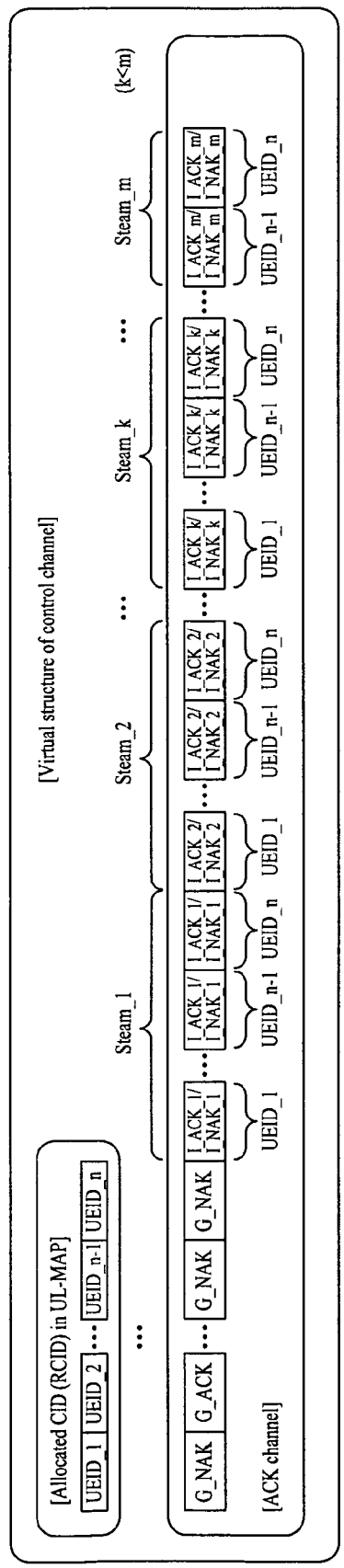
FIG. 13 is a diagram to describe a scheme for transmitting a group response signal in a bitmap format according to another embodiment of the present invention.

FIG. 13 is a diagram to describe a scheme for transmitting a group response signal in a bitmap format according to another embodiment of the present invention.

In the embodiment shown in FIG. 13, like the embodiment shown in FIG. 12, a group response signal for each user is preferentially allocated to a bitmap. Yet, in the embodiment shown in FIG. 14, unlike the embodiment shown in FIG. 12, response signals for HARQ process blocks of a group having group NAK generated are allocated to a bitmap continuously by gathering the same HARQ process block IDs of group allocated to each user together instead of allocating an individual response signal per a user having group NAK generated to a bitmap.

Referring to FIG. 13, group NAKs are generated from UE IDs 1, n−1 and n, which correspond to user identification information for identifying users, respectively. In the present embodiment, assume that total 'k' HARQ process blocks are allocated a user having UE ID 1 and assume that total m (k≠m) HARQ process blocks are allocated to users having UE IDs n−1 and n. So, after a group response signal has been allocated to a bitmap, a response signal is allocated to the bitmap in allocation order of the same HARQ process block ID in UL-MAP for each of the HARQ process blocks of users having the group NAK generated. It is understood that the above-explained embodiments are easily applicable to a case that a plurality of groups are allocated per a user and that a plurality of HARQ process blocks are allocated per the group. So far, the method of transmitting the group response signal using downlink HARQ ACK IE is explained. In the following description, a scheme for transmitting a group response signal in uplink is described.

The following embodiments of the present invention relate to a method of applying a response signal for HARQ process block as a response signal for HARQ process block from downlink.

Downlink response signal of single antenna system or vertical multi-antenna system can adopt a group response signal proposed by the present invention. So, since a single response signal is necessary for this case, it can be represented via a single group response signal. In particular, ACK indicating confirmation is represented as a group ACK signal and NAK indicating disconfirmation is represented as group NAK.

Like IEEE 802.16e system, it is able to transmit a group response signal using uplink ACK channel. Uplink ACK (acknowledgement) provides feedback for downlink HARQ. This channel is usable only for a user equipment that supports HARQ. User equipment transmits ACK or NAK signal for downlink HARQ process block. Single ACK channel occupies a half of subchannel. This corresponds to three 3*3 uplink tiles in case of selective PUSC or three 4*3 tiles in case of PUSC. Even half subchannel includes tile (0), tile (2) and tile (4) and odd half subchannel includes tile (1), tile (3) and tile (5). If the corresponding downlink HARQ process block is successfully received, confirmation bit of $n^{th}$ ACK channel is 0 (ACK). Otherwise, it is 1 (NAK). This 1-bit is encoded into a codeword having a length 3 for error correction as shown in Table 12.

TABLE 19

| ACK 1 bit symbol | Vector indexes per tile<br>Tile (0), Tile (2), Tile (4) for even half subchannel<br>Tile (1), Tile (3), Tile (5) for odd half subchannel |
|---|---|
| ACK | 0, 0, 0 |
| NAK | 4, 7, 2 |

Uplink ACK channel is orthogonal-modulated into QPSK symbols. $M_{n,8m+k}$ (0≦k≦7) is a modulation symbol index of $k^{th}$ modulation symbol within $m^{th}$ UL tile of $n^{th}$ uplink ACK channel. Possible modulation patterns $M_{n,8m}$, $M_{n,8m+1}$, ..., $M_{n,8m+7}$ including within $m^{th}$ tile of $n^{th}$ uplink channel are shown in Table 20.

TABLE 20

| Vector Index | $M_{n,8m}, M_{n,8m+1}, \ldots, M_{n,8m+7}$ |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

In Table 20, P0 = exp(j · π/4), P1 = exp(j · 3π/4), P2 = exp(−j · 3π/4), and P3 = exp(−j · π/4).

Figure 14:
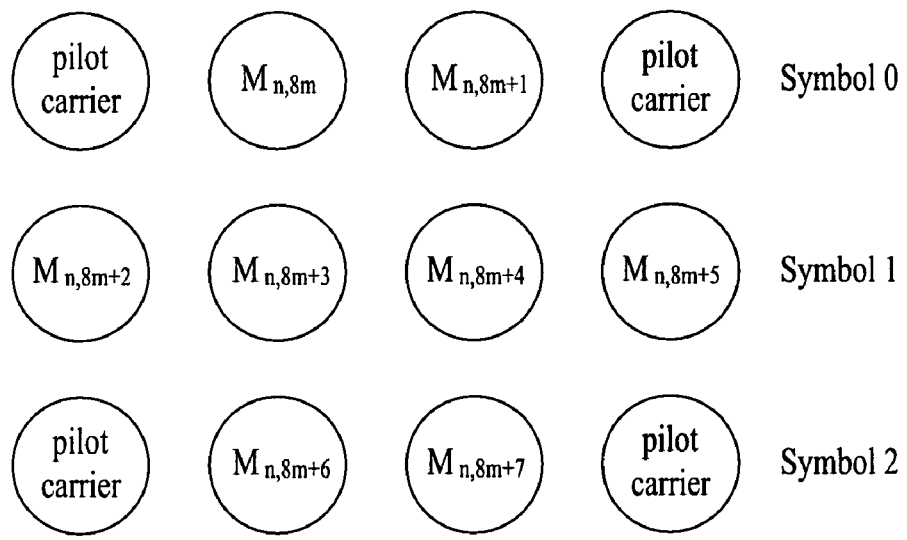
FIG. 14 is a diagram to depict subcarrier mapping of uplink modulated symbols in PUSC of a related art IEEE 802.16e system.
Figure 15:
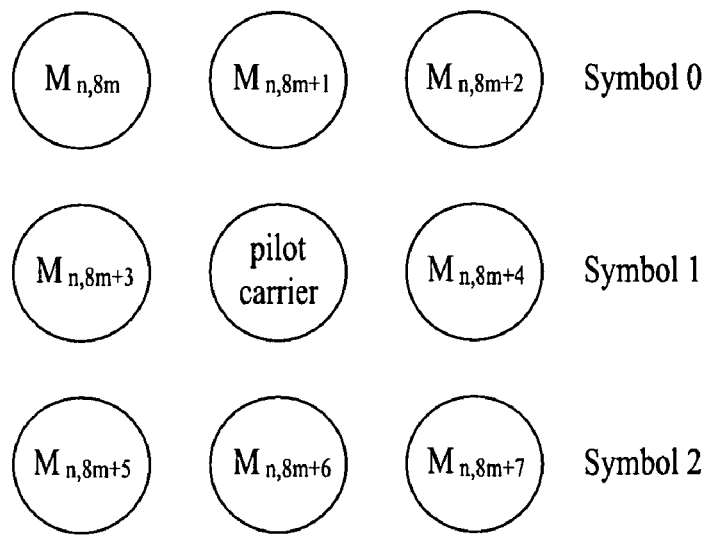
FIG. 15 is a diagram to depict subcarrier mapping of uplink modulated symbols in selective PUSC of a related art IEEE 802.16e system.

In PUSC UL subchannel, $M_{n,8m+k}$ is mapped to uplink ACK channel shown in FIG. 14. In selective PUSC uplink subchannel, $M_{n,8m+k}$ is mapped to uplink ACK subchannel shown in FIG. 15. Uplink ACK channel is mapped to half subchannel including three tiles. One subchannel includes six subchannels. In FIG. 14 or FIG. 15, subcarrier indexes increase toward right from left.

FIG. 14 is a diagram to depict subcarrier mapping of uplink modulated symbols in PUSC of a related art IEEE 802.16e system.

FIG. 15 is a diagram to depict subcarrier mapping of uplink modulated symbols in selective PUSC of a related art IEEE 802.16e system.

Thus, in single antenna system or vertical multi-antenna system, a single response signal is necessary like a related art. So, a single group response signal enables representation. In particular, ACK indicating confirmation is represented as a group ACK signal and NAK indicating disconfirmation is represented as a group NAK signal. Namely, a group response signal is transmitted using uplink ACK channel by utilizing orthogonal-modulated tiles as shown in Table 12.

Yet, in case of using horizontal multi-antenna system and/or a plurality of HARQ process blocks, response signals for HARQ process signals belonging to a prescribed group should be transmitted in uplink as well as a single group response signal. And, it is able to perform the transmission by the related art scheme. Hence, whole group response signals are transmitted using the index response signal scheme proposed in FIG. 11. As mentioned in the foregoing description, in case that ACK/NAK response signal for a single HARQ process block is transmitted using uplink ACK channel, transmission is carried out using three tiles corresponding to a half of subchannel. And, each of the tiles, as shown in Table 20, is orthogonal-modulated with eight kinds of vector indexes. When ACK/NAK signals for at least two HARQ process blocks are transmitted using uplink ACK channel, if transmission is carried out using six tiles corresponding to a single subchannel, total $8^6$ combinations are possible. Hence, it is able to perform group response signal representation for at least two HARQ process blocks and representation of ACK/NAK response signals for the respective HARQ process blocks. Details are explained as follows.

First of all, if a network transmits at least one HARQ process block in downlink, a user equipment processes the received HARQ process block and then transmits ACK/NAK response signal to the network in uplink. In case that the user equipment sends data or control information (e.g., CQI (channel quality indication) information, ACK/NAK information) using uplink, the network allocates size and position of resource for the data or control information in advance. Through this allocation, the user equipment sends its data and control information. Hence, the user equipment is able to transmit the data or control information after the size of the resource has been fixed. In the group response scheme, size of response signal ACK/NACK, which should be transmitted using uplink, differs according to a case that received data fully correspond to ACK or a case that received data do not fully correspond to ACK. So, it is difficult for a network to allocate resource to ACK/NAK signal, which is a response signal, in advance. In receiving control information on position and size of radio resource for response signal from the network, if the user equipment fails to receive the control information smoothly or if the user equipment is unable to sufficiently secure the radio resource of the response signal, the user equipment should secure response signal at least by itself. Hence, as observed through Table 1 and Table 2, the index response signal scheme requiring response signals less in average than the group response signal scheme is preferably adopted. And, compatibleness with resource allocation scheme in uplink ACK channel of IEEE 802.16e system is facilitated. The following embodiments relate to schemes for transmitting uplink group response signal using the index response signal scheme proposed in FIG. 11. In particular, in case that a channel environment keeps being in good state for a predetermined time, possible combinations of response signals of HARQ process blocks are transmitted entirely or in part in one of the formats shown in Tables 19 to 47 instead of transmitting response signals for whole HARQ process blocks. It is apparent to those skilled in the art that the following embodiments are applicable to a case that a channel environment keeps being in poor state for a predetermined time as well. Details of the embodiments are explained as follows.

First of all, explained in the following description is an embodiment for transmitting ACK or NAK response signals for a plurality of streams in a horizontal multi-input system by fixing the signal to a size of subchannel.

In case that entire HARQ process blocks are successfully received (G_ACK case), resource are allocated to al tiles of subchannel in a manner that vector index shown in Table 13 is 0. And, the corresponding allocation sequence is a sequence of tile (0), tile (2), tile (4), tile (3) and tile (5) in order. Subsequently, in case that there are at least tow HARQ process blocks simultaneously processed, vector indexes are assigned to cases that any one of the simultaneously processed blocks is not successfully received. The allocation is carried out in a manner of allocating bit 1 indicating G_NAK as a group response signal to a head, allocating bit 0 for successful reception (ACK) or bit 1 for unsuccessful reception (NAK) to HARQ process blocks next to the head in ascending order of corresponding HARQ process IDs. This allocation process is applicable to all cases amounting to possible combinations of response signals, and allocation can be carried out on a portion regarded as having high frequency lime the embodiment shown in FIG. 7. Each allocated combination is allocated to six orthogonal-modulated tiles as shown in Tables 22 to 24. The index group allocating method proposed by the present invention for a case of two simultaneously processed HARQ process blocks, a case of three simultaneously processed HARQ process blocks and a case of four simultaneously processed HARQ process blocks is shown in Tables 21 to 24. Vector index resource allocation in the following embodiment is just exemplary and may be carried out in a different manner.

TABLE 21

| | | | Vector indices per two tiles Tile (0), Tile (2), Tile (4) for even half subchannel |
|---|---|---|---|
| | ACK 2 bits symbols | | Tile (1), Tile (3), Tile (5) for odd half subchannel |
| G_NAK | Stream 1 | Stream 2 | |
| 1 | 0 | 1 | 1, 1, 1, 1, 1, 1 |
| 1 | 1 | 0 | 2, 2, 2, 2, 2, 2 |
| 1 | 1 | 1 | 3, 3, 3, 3, 3, 3 |

As can be observed from Table 21, in case that whole HARQ process blocks (hereinafter having the same meaning of streams) are successfully and fully received, an orthogonal modulation value corresponding to orthogonal modulation index 0 shown in Table 13 is allocated to uplink ACK channel in order of six tiles tile (0), tile (2), tile (4), tile (1), tile (3) and tile (5) configuring a single subchannel.

When two streams are transmitted, if NAK is generated from at least one of the streams, allocation can be carried out in a manner of Table 22.

TABLE 22

| Up to ACK 2 bits symbols | Vector indices per two tiles Tile (0), Tile (2), Tile (4) for even half subchannel Tile (1), Tile (3), Tile (5) for odd half subchannel | |
|---|---|---|
| G_ACK | 0, 0, 0, 0, 0, 0 | |
| G_NAK + {ACK/NAK, ACK/NAK, ... } | Transmission of two streams | cf. Table 22 |
| | Transmission of three Streams | cf. Table 23 |
| | Transmission of four Streams | cf. Table 24 |

As mentioned in the foregoing description, in case that NAK is generated from configuration streams in part, generation of group NAK is notified with bit 1. Bit 0 for successful reception (ACK) or bit 1 for unsuccessful reception (NAK) is allocated in ascending order of IDs of streams. This is represented as a decimal number in ascending order to configure a single subchannel including six tiles. Then, orthogonal modulation values corresponding to orthogonal modulation indexes shown in Table 15 are allocated to uplink ACK channel in order of the six tiles.

When three streams are transmitted, if NAK is generated from at least one of the streams, allocation can be carried out in a manner of Table 23.

TABLE 23

| G_NAK | ACK 3 bits symbols | | | Vector indices per two tiles Tile (0), Tile (2), Tile (4) for even half subchannel Tile (1), Tile (3), Tile (5) for odd half subchannel |
|---|---|---|---|---|
| | Stream 1 | Stream 2 | Stream 3 | |
| 1 | 0 | 0 | 1 | 1, 1, 1, 1, 1, 1 |
| 1 | 0 | 1 | 0 | 2, 2, 2, 2, 2, 2 |
| 1 | 0 | 1 | 1 | 3, 3, 3, 3, 3, 3 |
| 1 | 1 | 0 | 0 | 4, 4, 4, 4, 4, 4 |
| 1 | 1 | 0 | 1 | 5, 5, 5, 5, 5, 5 |
| 1 | 1 | 1 | 0 | 6, 6, 6, 6, 6, 6 |
| 1 | 1 | 1 | 1 | 7, 7, 7, 7, 7, 7 |

When three streams are transmitted, if NAK is generated from at least one of the streams, allocation can be carried out in a manner of Table 24.

TABLE 24

| G_NAK | ACK 3 bits symbols | | | | Vector indices per two tiles Tile(0), Tile(2), Tile(4) for even half Subchannel Tile(1), Tile(3), Tile(5) for odd half Subchannel |
|---|---|---|---|---|---|
| | Stream 1 | Stream 2 | Stream 3 | Stream 4 | |
| 1 | 0 | 0 | 0 | 1 | 1, 1, 1, 1, 1, 1 |
| 1 | 0 | 0 | 1 | 0 | 2, 2, 2, 2, 2, 2 |
| 1 | 0 | 0 | 1 | 1 | 3, 3, 3, 3, 3, 3 |
| 1 | 0 | 1 | 0 | 0 | 4, 4, 4, 4, 4, 4 |
| 1 | 0 | 1 | 0 | 1 | 5, 5, 5, 5, 5, 5 |
| 1 | 0 | 1 | 1 | 0 | 6, 6, 6, 6, 6, 6 |
| 1 | 0 | 1 | 1 | 1 | 7, 7, 7, 7, 7, 7 |
| 1 | 1 | 0 | 0 | 0 | 2, 4, 3, 6, 7, 5 |
| 1 | 1 | 0 | 0 | 1 | 3, 5, 2, 7, 6, 4 |
| 1 | 1 | 0 | 1 | 0 | 0, 6, 1, 4, 5, 7 |
| 1 | 1 | 0 | 1 | 1 | 1, 7, 0, 5, 4, 6 |
| 1 | 1 | 1 | 0 | 0 | 6, 0, 7, 2, 3, 1 |
| 1 | 1 | 1 | 0 | 1 | 7, 1, 6, 3, 2, 0 |
| 1 | 1 | 1 | 1 | 0 | 4, 2, 5, 0, 1, 3 |
| 1 | 1 | 1 | 1 | 1 | 5, 3, 4, 1, 0, 2 |

In the following embodiment proposed by the present invention, unlike the above-explained embodiment, proposed is a method of incrementing the number of subchannels used in accordance with the number of simultaneously ACK/NAK (i.e., number of independent streams). In particular, assuming that a single ACK/NAK response signal has 'n' subchannels, 'k' ACK/NAK response signals have k×n subchannels. For instance, assuming that a half of subchannel is allocated to a single ACK signal, if two HARQ process blocks (streams) are transmitted, a single subchannel is used to represent ACK/NAK response signal. If three streams are transmitted, one and half subchannel are used to represent ACK/NAK response signal. For compatibility with IEEE 802.16e system, it is able to carry out resource allocation of vectors, as shown in Table 12, in order of even-odd tiles, i.e., in order of tile (0), tile (2), tile (4), tile (1), tile (3) and tile (5) or in a different manner. In the present embodiment, for compatibility with conventional systems, allocation is carried out in order of tile (0), tile (2), tile (4), tile (1), tile (3) and tile (5). Tables 18 to 23 show resource allocation for a case of incrementing the number of subchannels used in accordance with the number of streams (i.e., received downlink HARQ process blocks) by considering compatibility with IEEE 802.16e system proposed by an embodiment of the present invention.

Table 25 and Table 26 depict examples of resource allocation to transmit uplink ACK channel for two HARQ process blocks according to an embodiment of the present invention.

TABLE 25

| Up to ACK 2 bits symbols | Vector indices per two tiles Tile (0), Tile (2), Tile (4) for even half Subchannel Tile (1), Tile (3), Tile (5) for odd half subchannel |
|---|---|
| G_ACK | 0, 0, 0, 0, 0, 0 |
| G_NAK + {ACK/NAK, ACK/NAK.} | cf. Table 26 |

TABLE 26

| G_NAK | ACK 2 bits symbols | | Vector indices per two tiles Tile (0), Tile (2), Tile (4) for even half subchannel Tile (1), Tile (3), Tile (5) for even half subchannel |
|---|---|---|---|
| | Stream 1 | Stream 2 | |
| 1 | 0 | 1 | 1, 1, 1, 1, 1, 1 |
| 1 | 1 | 0 | 2, 2, 2, 2, 2, 2 |
| 1 | 1 | 1 | 3, 3, 3, 3, 3, 3 |

Since response signals for two streams are necessary, total one subchannel is necessary. In the allocations of Tables 21 to 24, in case that total two streams are fully successful response signals, orthogonal-modulated value corresponding to vector index 0 shown in Table 13 is allocated in order of tile (0), tile (2), tile (4), tile (1), tile (3) and tile (5). In case that any one of two streams is an unsuccessful response signal, it is able to allocate orthogonal-modulated value corresponding to a sequence and vector index shown in Table 26.

Table 27 and Table 28 depict examples of resource allocation to transmit uplink ACK channel for three HARQ process blocks according to an embodiment of the present invention. The number of necessary subchannels is one and half subchannel that corresponds to total nine tiles. Detailed descriptions of resource allocation are identical to those of Table 25 and Table 26.

TABLE 27

| ACK 2 bits symbol or over | Vector indices per two tiles Tile (0), Tile (2), Tile (4) for even half subchannel Tile (1), Tile (3), Tile (5) for odd half subchannel |
|---|---|
| G_ACK | 0, 0, 0, 0, 0, 0, 0, 0, 0 |
| G_NAK + {ACK/NAK, ACK/NAK, ACK/NAK} | Cf. Table 28 |

TABLE 28

| G_NAK | ACK 3 bits symbols | | | Vector indices per two tiles Tile (0), Tile (2), Tile (4) for even half Subchannel Tile (1), Tile (3), Tile (5) for odd half subchannel |
|---|---|---|---|---|
| | Stream 1 | Stream 2 | Stream 3 | |
| 1 | 0 | 0 | 1 | 1, 1, 1, 1, 1, 1, 1, 1, 1 |
| 1 | 0 | 1 | 0 | 2, 2, 2, 2, 2, 2, 2, 2, 2 |
| 1 | 0 | 1 | 1 | 3, 3, 3, 3, 3, 3, 3, 3, 3 |
| 1 | 1 | 0 | 0 | 4, 4, 4, 4, 4, 4, 4, 4, 4 |
| 1 | 1 | 0 | 1 | 5, 5, 5, 5, 5, 5, 5, 5, 5 |
| 1 | 1 | 1 | 0 | 6, 6, 6, 6, 6, 6, 6, 6, 6 |
| 1 | 1 | 1 | 1 | 7, 7, 7, 7, 7, 7, 7, 7, 7 |

Table 29 and Table 30 depict examples of resource allocation to transmit uplink ACK channel for four HARQ process blocks according to an embodiment of the present invention. The number of necessary subchannels is two that corresponds to total twelve tiles. Detailed descriptions of resource allocation are identical to those of Table 25 and Table 26.

TABLE 29

| ACK 4 bits symbols | Vector indices per two tiles Tile (0), Tile (2), Tile (4) for even half subchannel Tile (1), Tile (3), Tile (5) for odd half subchannel |
|---|---|
| G_ACK | 0, 0, 0, 0, 0, 0, 0, 0, 0, 0, 0, 0 |
| G_NAK + {ACK/NAK, ACK/NAK, ACK/NAK, ACK/NAK} | cf. Table 30 |

TABLE 30

| G_NAK | Stream 1 | Stream 2 | Stream 3 | Stream 4 | Vector indices per two tiles Tile(0), Tile(2), Tile(4) for even half Subchannel Tile(1), Tile(3), Tile(5) for odd half Subchannel |
|---|---|---|---|---|---|
| 1 | 0 | 0 | 0 | 1 | 1, 1, 1, 1, 1, 1, 1, 1, 1, 1, 1, 1 |
| 1 | 0 | 0 | 1 | 0 | 2, 2, 2, 2, 2, 2, 2, 2, 2, 2, 2, 2 |
| 1 | 0 | 0 | 1 | 1 | 3, 3, 3, 3, 3, 3, 3, 3, 3, 3, 3, 3 |
| 1 | 0 | 1 | 0 | 0 | 4, 4, 4, 4, 4, 4, 4, 4, 4, 4, 4, 4 |
| 1 | 0 | 1 | 0 | 1 | 5, 5, 5, 5, 5, 5, 5, 5, 5, 5, 5, 5 |
| 1 | 0 | 1 | 1 | 0 | 6, 6, 6, 6, 6, 6, 6, 6, 6, 6, 6, 6 |
| 1 | 0 | 1 | 1 | 1 | 7, 7, 7, 7, 7, 7, 7, 7, 7, 7, 7, 7 |
| 1 | 1 | 0 | 0 | 0 | 2, 4, 3, 6, 7, 5, 2, 4, 3, 6, 7, 5 |
| 1 | 1 | 0 | 0 | 1 | 3, 5, 2, 7, 6, 4, 3, 5, 2, 7, 6, 4 |
| 1 | 1 | 0 | 1 | 0 | 0, 6, 1, 4, 5, 7, 0, 6, 1, 4, 5, 7 |
| 1 | 1 | 0 | 1 | 1 | 1, 7, 0, 5, 4, 6, 1, 7, 0, 5, 4, 6 |
| 1 | 1 | 1 | 0 | 0 | 6, 0, 7, 2, 3, 1, 6, 0, 7, 2, 3, 1 |
| 1 | 1 | 1 | 0 | 1 | 7, 1, 6, 3, 2, 0, 7, 1, 6, 3, 2, 0 |
| 1 | 1 | 1 | 1 | 0 | 4, 2, 5, 0, 1, 3, 4, 2, 5, 0, 1, 3 |
| 1 | 1 | 1 | 1 | 1 | 5, 3, 4, 1, 0, 2, 5, 3, 4, 1, 0, 2 |

The following embodiment relates to a method of using the resource allocating methods for uplink ACK channel proposed in Tables 2 to 30 together. The uplink ACK channel resource allocation scheme proposed in Tables 21 to 24 is the scheme to reduce load caused by overhead of channel resources, while the scheme shown in Tables 25 to 30 is the scheme for reliable transmission of uplink ACK channel. And, trade-off relation is established between the two schemes in aspects of necessary resource quantity and reliability of information. In particular, the number of subchannels in use is appropriately incremented in accordance with the number of ACK/NAK response signals to be simultaneously processed (i.e., the number of independent streams). In this case, the allocation method can be simplified by fixing a size of a case of group ACK generation and a size of a case of group NAK generation to a same value. For instance, in case that two or three HARQ process blocks (i.e., streams) are transmitted, a single subchannel is used to represent ACK/NAK response signal. In case that four or more streams are transmitted, two subchannels are used to represent ACK/NAK response signal. By avoiding the load of linear increment of resource allocation according to increment of simultaneously processed HARQ process blocks through this allocation scheme, it is able to adjust resource allocation necessary for reliable transmission of uplink ACK channel to be suitable for system and channel statuses and resource status. Namely, allocation quantity of subchannels according to the simultaneously processed HARQ process blocks can be allocated in a manner different from the above-mentioned scheme.

Tables 31 to 36 show examples of uplink ACK channel resource allocation scheme, as described in the former examples, by considering trade-off relation between overhead of uplink ACK channel resources and reliable ACK/NAK information transfer according to another embodiment of the present invention. In particular, a single subchannel is allocated for up to three simultaneously processed HARQ process blocks, two subchannels are allocated for four or more simultaneously processed HARQ process blocks, and a size of a case for group ACK generation is equal to that of a case for group NAK generation.

TABLE 31

| Up to ACK 2 bits symbols | Vector indices per two tiles Tile (0), Tile (2), Tile (4) for even half subchannel Tile (1), Tile (3), Tile (5) for odd half subchannel |
|---|---|
| G_ACK | 0, 0, 0, 0, 0, 0 |
| G_NAK + {ACK/NAK, ACK/NAK} | cf. Table 26 |

TABLE 32

| Up to ACK 3 bits Symbols | Vector indices per two tiles Tile (0), Tile (2), Tile (4) for even half subchannel Tile (1), Tile (3), Tile (5) for odd half subchannel |
|---|---|
| G_ACK | 0, 0, 0, 0, 0, 0 |
| G_NAK + {ACK/NAK.ACK/NAK, ACK/NAK} | cf. Table 28 |

TABLE 33

| ACK 4 bit symbol or more | Vector indices per two tiles Tile (0), Tile (2), Tile (4) for even half subchannel Tile (1), Tile (3), Tile (5) for odd half subchannel |
|---|---|
| G_ACK | 0, 0, 0, 0, 0, 0, 0, 0, 0, 0, 0, 0 |
| G_NAK + {ACK/NAK, ACK/NAK, ACK/NAK, ACK/NAK} | cf. Table 30 |

Sequence of orthogonal vector according to orthogonal modulation in Table 12 for tiles of subchannel is explained as follows. Generation combinations of group ACK (G_ACK) and group NAK (G_NAK) are represented using eight kinds of vectors having vector indexes 0 to 7 shown in Table 20. For instance, in case that six tiles are used to represent a single combination shown in Table 24, sixteen kinds among $8^6$ combinations are bound to a single set. And, there exist a plurality of the sets of the sixteen kinds. In this case, by finding distances between the respective vector combinations within a set, a minimum value of the distances is named a minimum distance. The minimum distances of the respective sets may have different values. If a set having a greatest one of the minimum distances of the sets is selected, signal reliability is raised to enhance system performance.

The distances can be found in various ways. Hamming distance is the number of different characters on the same position in two character strings of the same length. Namely, the hamming distance indicates how many letters need to be changed to change one character string into another character string.

Besides, Euclidean distance can be represented as Formula 7 on the assumption that there are 'n' row vectors $x_i = \{x_1, x_2, \ldots, x_n\}$ and $y_i = \{y_1, y_2, \ldots, y_n\}$.

$$d = [(x_i - y_i)^T(x_i - y_i)]^{1/2}$$
$$= \left[\sum_{i=1}^{n}(x_i - y_i)^2\right]^{1/2},$$
$$i = 1, 2, \ldots, n$$

[Formula 7]

Table 20 shows vectors disclosed in IEEE 802.16. And, it is known that hamming distance of each vector 0-7 is 8. For instance, in generating four HARQ process blocks, the following method s used. This refers to the related art CQI generating method.

First of all, in order for combinations of vectors not to be overlapped with each other, {0,0,0,0,0,0}, {1,1,1,1,1,1}, ..., {7,7,7,7,7,7} are generated. [If combinations of vectors are not overlapped with each other, it is most orthogonal to have distance of 48 (=8*6)]

Next combinations are generated in a manner that the previously generated eight combinations are overlapped with single bits, respectively. To find a highest distance next to the non-overlapped combinations, combinations are generated to be overlapped with single bits only, respectively. In particular, six kinds are selected from vectors 0 to 7 in one sequence in a manner that the rest of sequences avoid having the same vector. And, distances provided by the above method are 48 and 40, respectively. Hence, a minimum distance is 40. If Euclidean distance is found based on the above hamming distance, Euclidean distance differs despite that the hamming distance is identical.

This is because distances between eight vectors have values shown in the following table.

TABLE 34

|  | Euclidean distance | Hamming distance |
|---|---|---|
| 16e vector | Max. = 6.828427<br>Min. = 5.656854<br>cf. Table 35 | 8<br>cf. Table 36 |

TABLE 35

| |
|---|
| distance[0][0] = 0.000000 |
| distance[0][1] = 5.656854 |
| distance[0][2] = 6.828427 |
| distance[0][3] = 6.828427 |
| distance[0][4] = 6.828427 |
| distance[0][5] = 6.828427 |
| distance[0][6] = 6.828427 |
| distance[0][7] = 6.828427 |

Distance [x] [y] is Euclidean distance of vectors x and y in Formula 7. By this method, it is able to find a distance between different sequences.

TABLE 36

| |
|---|
| distance[0][0] = 0.000000 |
| distance[0][1] = 8.000000 |
| distance[0][2] = 8.000000 |
| distance[0][3] = 8.000000 |
| distance[0][4] = 8.000000 |
| distance[0][5] = 8.000000 |
| distance[0][6] = 8.000000 |
| distance[0][7] = 8.000000 |

Distance [x] [y] is Euclidean distance of vectors x and y in Formula 7. By this method, it is able to find a distance between sequences.

TABLE 37

| | | | |
|---|---|---|---|
| distance[0][0] = 0.000000 | distance[2][0] = 40.970563 | distance[4][0] = 40.970563 | distance[6][0] = 40.970563 |
| distance[0][1] = 33.941125 | distance[2][1] = 40.970563 | distance[4][1] = 40.970563 | distance[6][1] = 40.970563 |
| distance[0][2] = 40.970563 | distance[2][2] = 00.000000 | distance[4][2] = 40.970563 | distance[6][2] = 40.970563 |
| distance[0][3] = 40.970563 | distance[2][3] = 33.941125 | distance[4][3] = 40.970563 | distance[6][3] = 40.970563 |
| distance[0][4] = 40.970563 | distance[2][4] = 40.970563 | distance[4][4] = 00.000000 | distance[6][4] = 33.941125 |
| distance[0][5] = 40.970563 | distance[2][5] = 40.970563 | distance[4][5] = 33.941125 | distance[6][5] = 33.941125 |
| distance[0][6] = 40.970563 | distance[2][6] = 40.970563 | distance[4][6] = 33.941125 | distance[6][6] = 00.000000 |
| distance[0][7] = 40.970563 | distance[2][7] = 40.970563 | distance[4][7] = 33.941125 | distance[6][7] = 33.941125 |
| distance[1][0] = 33.941125 | distance[3][0] = 40.970563 | distance[5][0] = 40.970563 | distance[7][0] = 40.970563 |
| distance[1][1] = 00.000000 | distance[3][1] = 40.970563 | distance[5][1] = 40.970563 | distance[7][1] = 40.970563 |
| distance[1][2] = 40.970563 | distance[3][2] = 33.941125 | distance[5][2] = 40.970563 | distance[7][2] = 40.970563 |

TABLE 37-continued

| | | | |
|---|---|---|---|
| distance[1][3] = 40.970563 | distance[3][3] = 00.000000 | distance[5][3] = 40.970563 | distance[7][3] = 40.970563 |
| distance[1][4] = 40.970563 | distance[3][4] = 40.970563 | distance[5][4] = 33.941125 | distance[7][4] = 33.941125 |
| distance[1][5] = 40.970563 | distance[3][5] = 40.970563 | distance[5][5] = 33.941125 | distance[7][5] = 33.941125 |
| distance[1][6] = 40.970563 | distance[3][6] = 40.970563 | distance[5][6] = 33.941125 | distance[7][6] = 33.941125 |
| distance[1][7] = 40.970563 | distance[3][7] = 40.970563 | distance[5][7] = 33.941125 | distance[7][7] = 00.000000 |

Distance [x] [y] is Euclidean distance of vectors x and y in Formula 7.

Hence, a greatest value among finally provided Euclidean minimum distances is 32.971 (cf. Table 38).

TABLE 38

Refer_Vector 0 = {0 0 0 0 0 0}
Refer_Vector 1 = {1 1 1 1 1 1}
Refer_Vector 2 = {2 2 2 2 2 2}
Refer_Vector 3 = {3 3 3 3 3 3}
Refer_Vector 4 = {4 4 4 4 4 4}
Refer_Vector 5 = {5 5 5 5 5 5}
Refer_Vector 6 = {6 6 6 6 6 6}
Refer_Vector 7 = {7 7 7 7 7 7}
Minimum_distance = 32.970563
Refer_Vector 0 = {0 0 0 0 0 0}
Refer_Vector 1 = {1 1 1 1 1 1}
Refer_Vector 2 = {2 2 2 2 2 2}
Refer_Vector 3 = {3 3 3 3 3 3}
Refer_Vector 4 = {4 4 4 4 4 4}
Refer_Vector 5 = {5 5 5 5 5 5}
Refer_Vector 6 = {6 6 6 6 6 6}
Refer_Vector 7 = {7 7 7 7 7 7}
Refer_Vector 8 = {0 1 2 3 4 5}
Refer_Vector 9 = {0 2 1 4 3 6}
Refer_Vector 10 = {0 3 4 1 5 2}
Refer_Vector 11 = {1 0 3 2 5 4}
Refer_Vector 12 = {1 2 5 0 4 3}
Refer_Vector 13 = {1 3 0 5 2 7}
Refer_Vector 14 = {2 0 1 5 6 3}
Refer_Vector 15 = {2 1 4 0 3 7}
Minimum_distance = 32.970563

By this method it is able to find a distance between sequences.

Hence, sets having a great Euclidean distance should be found.

First of all, the number of necessary combinations with reference to combination indicating group ACK (G_ACK) signal should be found. Since it is currently assumed that 000000 is group ACK (G_ACK), the rest of combinations should be found with reference to 000000. IT is then searched for a high minimum distance of each set using Euclidean distance.

For example, a case (cf. Table 19) of indicating a single ACK/NAK signal is described as follows.

First of all, since three vectors are used, 24 (=8*3) becomes maximum minimum Hamming distance.

If distance is found by Euclidean distance method using vectors shown in Table 20, a value having a greatest minimum value among all sets having two combinations is 20.485281. Table 39 shows combinations having maximum values of Euclidean distances in part.

TABLE 39

Refer_Vector0 = {0 0 0}, Refer_Vector1 = {2 2 2}, minimum_distance = 20.485281
Refer_Vector0 = {0 0 0}, Refer_Vector1 = {2 2 3}, minimum_distance = 20.485281
Refer_Vector0 = {0 0 0}, Refer_Vector1 = {2 2 4}, minimum_distance = 20.485281
Refer_Vector0 = {0 0 0}, Refer_Vector1 = {2 2 5}, minimum_distance = 20.485281
Refer_Vector0 = {0 0 0}, Refer_Vector1 = {2 2 6}, minimum_distance = 20.485281
Refer_Vector0 = {0 0 0}, Refer_Vector1 = {2 2 7}, minimum_distance = 20.485281
Refer_Vector0 = {0 0 0}, Refer_Vector1 = {2 3 2}, minimum_distance = 20.485281
Refer_Vector0 = {0 0 0}, Refer_Vector1 = {2 3 3}, minimum_distance = 20.485281
Refer_Vector0 = {0 0 0}, Refer_Vector1 = {2 3 4}, minimum_distance = 20.485281

By this method, it is able to find distance between sequences.

In case of transmitting ACK/NAK for two HARQ process blocks, four kinds of states of ACK/NAK are possible. Information on the set is shown in Table 40.

TABLE 40

Refer_Vector0 = {0 0 0 0 0 0}, Refer_Vector1 = {1 2 2 2 2 2},
Refer_Vector2 = {2 1 3 4 4 4}, Refer_Vector3 = {4 4 4 1 3 5}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 1 3 6}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 1 3 7}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 1 5 3}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 1 6 3}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 1 7 3}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 3 1 5}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 3 1 6}
minimum_distance = 39.798990
Refer_Vector0 = {0 0 0 0 0 0}, Refer_Vector1 = {1 2 2 2 2 2},
Refer_Vector2 = {2 1 3 4 4 4}, Refer_Vector3 = {4 4 4 3 1 7}
minimum_distance = 39.798990

By this method, it is able to find distance between sequences.

As can be observed from this, maximum minimum Hamming distance is 40 and maximum minimum Euclidean distance is 39.798990.

In case of transmitting ACK/NAK for three HARQ process blocks, eight kinds of states of ACK/NAK are possible. Information on the set is shown in Table 41.

TABLE 41

Refer_Vector0 = {0 0 0 0 0 0}, Refer_Vector1 = {0 2 2 2 2 2},
Refer_Vector2 = {0 4 4 4 4 4}, Refer_Vector3 = {1 1 1 1 1 1},
Refer_Vector4 = {1 3 3 3 3 3}, Refer_Vertor5 = {1 5 5 5 5 5},
Refer_Vector6 = {2 0 2 6 6 6}, Refer_Vector7 = {3 1 3 7 7 7},
minimum_distance = 33.941125
Refer_Vector0 = {0 0 0 0 0 0}, Refer_Vector1 = {0 2 2 2 2 2},
Refer_Vector2 = {0 4 4 4 4 4}, Refer_Vector3 = {1 1 1 1 1 1},
Refer_Vector4 = {1 3 3 3 3 3}, Refer_Vertor5 = {1 5 5 5 5 5},
Refer_Vector6 = {2 0 2 6 6 6}, Refer_Vector7 = {3 1 6 2 7 7},
minimum_distance = 33.941125
Refer_Vector0 = {0 0 0 0 0 0}, Refer_Vector1 = {0 2 2 2 2 2},
Refer_Vector2 = {0 4 4 4 4 4}, Refer_Vector3 = {1 1 1 1 1 1},
Refer_Vector4 = {1 3 3 3 3 3}, Refer_Vertor5 = {1 5 5 5 5 5},
Refer_Vector6 = {2 0 2 6 6 6}, Refer_Vector7 = {3 1 6 3 7 7},
minimum_distance = 33.941125
Refer_Vector0 = {0 0 0 0 0 0}, Refer_Vector1 = {0 2 2 2 2 2},
Refer_Vector2 = {0 4 4 4 4 4}, Refer_Vector3 = {1 1 1 1 1 1},
Refer_Vector4 = {1 3 3 3 3 3}, Refer_Vertor5 = {1 5 5 5 5 5},
Refer_Vector6 = {2 0 2 6 6 6}, Refer_Vector7 = {3 1 3 7 2 7},
minimum_distance = 33.941125

By this method, it is able to find distance between sequences.

As can be observed from this, maximum minimum Hamming distance is 40 and maximum minimum Euclidean distance is 33.941125.

Subsequently, a new vector index set is found using a new modulation index table of Table 42.

TABLE 42

| Vector Index | $M_{n, 8m}, M_{n, 8m+1}, \ldots, M_{n, 8m+7}$ |
|---|---|
| 0 | P0, P0, P0, P0, P0, P0, P0, P0 |
| 1 | P3, P3, P3, P3, P3, P3, P3, P3 |
| 2 | P0, P2, P0, P2, P0, P2, P0, P2 |
| 3 | P3, P1, P3, P1, P3, P1, P3, P1 |
| 4 | P0, P0, P2, P2, P0, P0, P2, P2 |
| 5 | P3, P3, P1, P1, P3, P3, P1, P1 |
| 6 | P0, P2, P2, P0, P0, P2, P2, P0 |
| 7 | P3, P1, P1, P3, P3, P1, P1, P3 |
| 8 | P0, P0, P0, P0, P2, P2, P2, P2 |
| 9 | P3, P3, P3, P3, P1, P1, P1, P1 |
| 10 | P0, P2, P0, P2, P2, P0, P2, P0 |
| 11 | P3, P1, P3, P1, P1, P3, P1, P3 |
| 12 | P0, P0, P2, P2, P2, P2, P0, P0 |
| 13 | P3, P3, P1, P1, P1, P1, P3, P3 |
| 14 | P0, P2, P2, P0, P2, P0, P0, P2 |
| 15 | P3, P1, P1, P3, P1, P3, P3, P1 |

Table 43 shows each distance between the new vectors.

TABLE 43

| | Euclidean Distance | Hamming Distance |
|---|---|---|
| New vector in Table 42 | Max. = 8.000000<br>Min. = 5.656854<br>cf. Table 44 | 8<br>cf. Table 45 |

TABLE 44

Distance[0][0] = 0.000000
Distance[0][1] = 8.000000
Distance[0][2] = 5.656854
Distance[0][3] = 8.000000
Distance[0][4] = 5.656854
Distance[0][5] = 8.000000

TABLE 44-continued

Distance[0][6] = 5.656854
Distance[0][7] = 8.000000
Distance[0][8] = 5.656854
Distance[0][9] = 8.000000
Distance[0][10] = 5.656854
Distance[0][11] = 8.000000
Distance[0][12] = 5.656854
Distance[0][13] = 8.000000
Distance[0][14] = 5.656854
Distance[0][15] = 8.000000

Distance [x] [y] is Euclidean distance of vectors x and y in Formula 7.

By this method, it is able to find distance between sequences.

TABLE 45

Distance[0][0] = 0.000000
Distance[0][1] = 8.000000
Distance[0][2] = 8.000000
Distance[0][3] = 8.000000
Distance[0][4] = 8.000000
Distance[0][5] = 8.000000
Distance[0][6] = 8.000000
Distance[0][7] = 8.000000
Distance[0][8] = 8.000000
Distance[0][9] = 8.000000
Distance[0][10] = 8.000000
Distance[0][11] = 8.000000
Distance[0][12] = 8.000000
Distance[0][13] = 8.000000
Distance[0][14] = 8.000000
Distance[0][15] = 8.000000

Distance [x] [y] is Euclidean distance of vectors x and y in Formula 7.

By this method, it is able to find distance between sequences.

Example for a case that a single ACK/NAK signal is indicated using new vectors shown in Table 45 is shown in Table 46.

TABLE 46

| ACK 1 bit symbol | Vector indices per tile<br>Tile (0), Tile (2), Tile (4) for even half subchannel<br>Tile (1), Tile (3), Tile (5) for odd half subchannel |
|---|---|
| ACK | 0, 0, 0 |
| NAK | 15, 15, 15 |

Since three vectors are used, '24 (=8*3)' becomes a maximum minimum Hamming distance. If a distance is found by Euclidean distance method using new vectors, a greatest value of minimum distance among all sets having two combinations each is 24. Since previous (4, 7, 2) does not have Euclidean distance of 24, one of the sets shown in Table 47 should be used.

TABLE 47

Refer_Vector0 = {0 0 0}, Refer_Vector1 = {1 1 1},
minimum_distance = 24.000000
Refer_Vector0 = {0 0 0}, Refer_Vector1 = {1 1 3},
minimum_distance = 24.000000
Refer_Vector0 = {0 0 0}, Refer_Vector1 = {1 1 5},
minimum_distance = 24.000000

TABLE 47-continued

Refer_Vector0 = {0 0 0}, Refer_Vector1 = {1 1 7},
minimum_distance = 24.000000
Refer_Vector0 = {0 0 0}, Refer_Vector1 = {1 1 9},
minimum_distance = 24.000000
Refer_Vector0 = {0 0 0}, Refer_Vector1 = {1 1 11},
minimum_distance = 24.000000
Refer_Vector0 = {0 0 0}, Refer_Vector1 = {1 1 13},
minimum_distance = 24.000000
Refer_Vector0 = {0 0 0}, Refer_Vector1 = {1 1 15},
minimum_distance = 24.000000
Refer_Vector0 = {0 0 0}, Refer_Vector1 = {1 3 1},
minimum_distance = 24.000000

By this method, it is able to find distance between sequences.

Figure 16:
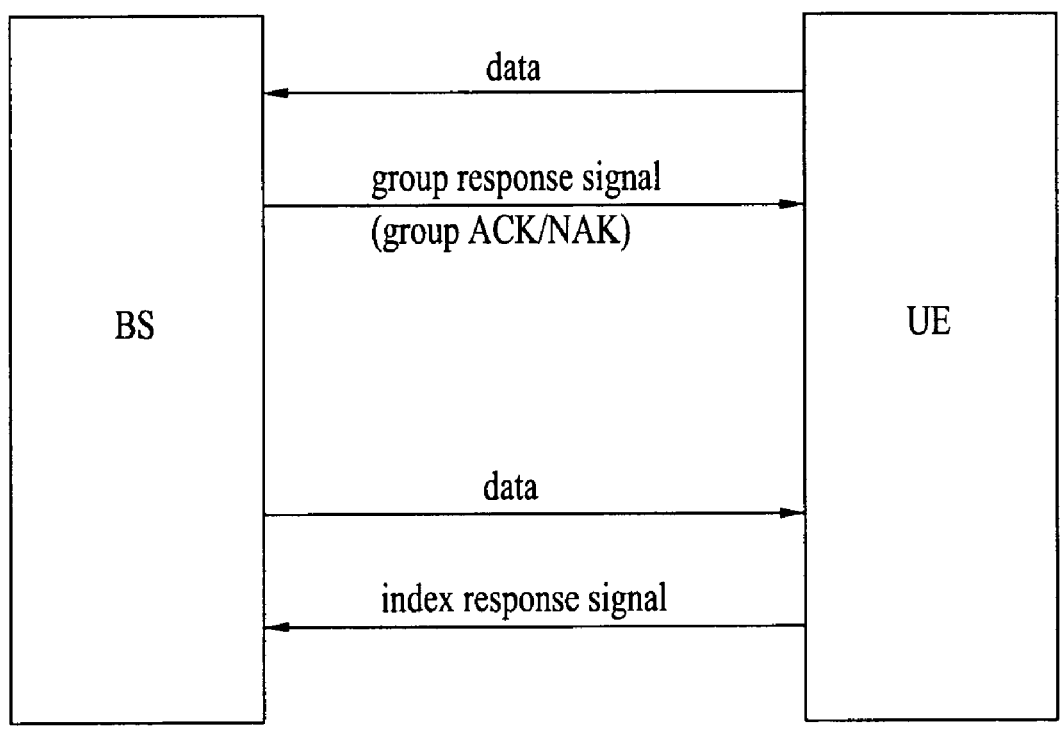
FIG. 16 is a diagram to depict hybrid response signal operating scheme of a system according to an embodiment of the present invention.

FIG. 16 is a diagram to depict hybrid response signal operating scheme of a system according to an embodiment of the present invention. As mentioned in the foregoing description, if a user equipment transmits data in uplink, a network processes the received data and then transmits group response signal (group ACK/NAK signal) as a response signal for the data. For this, the network uses bitmap of DL_MAP_HARQ_IE. On the contrary, if the network transmits data in downlink, the user equipment processes the received data and then transmits ACK/NAK signal to the network on uplink ACK channel of the present invention.

According to another embodiment of the present invention, proposed is control information for selection of a plurality of response signal transmitting and receiving schemes. As mentioned in the foregoing description, a method of transmitting a response signal for data such as a received HARQ process block can use various schemes proposed by the present invention in accordance with a current channel status between a network and a user equipment. For clearer operation of system, it is able to exchange control information indicating the response signal transmitting and receiving scheme between a network and a user equipment. In particular, in case that a channel environment changed in various ways, while response signals for entire HARQ process blocks are transmitted and received, if one side decides that the channel environment meets a specific reference value, it is able to use control information containing response signal operation scheme indicator information that requests or instructs group signal scheme (including scheme using DL_MAP_HARQ_IE), index response signal scheme (including uplink channel use scheme) or response signal operation scheme as the group response signal scheme and the index response signal scheme by discriminating uplink or downlink. Moreover, in case that one side fails to allocate radio resource for response signal to the other side, the other side selects a specific response signal scheme and then transmits information on the selected specific response signal scheme to the one side.

In the above detailed description, a process for performing communications between a transmitter and a receiver is mainly explained for clarity and convenience of description of embodiments of the present invention. In particular, the transmitter may include a user equipment or a base station of a network, while the receiver may include a base station of a network or a user equipment. Besides, the terminologies used in this disclosure can be replaced by other terminologies having the same meanings. For instance, a user equipment can be replaced by a mobile station, a mobile terminal, a communication terminal, a user device or the like, while a base station can be replaced by a fixed station, Node B (NB), eNB or the like.

INDUSTRIAL APPLICABILITY

Accordingly, the present invention minimizes the linearly incremented number of response signals using a group response signal scheme or an index response signal scheme proposed by an embodiment of the present invention as a scheme for transmitting response signals for downlink and uplink HARQ process blocks, thereby raising data transmission efficiency.

And, in case that a transmitter fails to allocate a resource for a response signal to a receiver supposed to send the response signal, the receiver is able to make a response using minimum resource.

Moreover, the present invention enables a transmitter and a receiver to realize different response signal transmitting and receiving methods, thereby raising system efficiency.

Besides, the ACK/NACK response signal transmitting scheme to indicate a presence or non-presence of successful reception of HARQ process block is appropriately applicable to 3GPP LTE system and IEEE 802.16e and IEEE 802.16m system of which standardizations are in progress. Moreover, the scheme is applicable to prescribed wireless communication systems for transmitting a response signal indicating a presence or non-presence of successful reception in a system using HARQ process as well as the former systems according to the same principles.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for a receiver to transmit a response signal for a transmission signal from at least one transmitter in a communication system, the method comprising:

receiving at least one data block from the at least one transmitter, the at least one data block grouped into at least one group and then transmitted by the at least one transmitter;

checking whether the at least one data block contained in a corresponding group is successfully received per each group; and transmitting the response signal instructing a presence or non-presence of successful reception of the data block to the at least one transmitter by a specific transmission scheme selected from among a first scheme of transmitting the response signal per the data block, a second scheme of transmitting the response signal by including a group response signal for each group and a third scheme of transmitting an index of a data block response signal set per each group, wherein the second scheme comprises transmitting a single response signal for each group and the second scheme comprises:

transmitting a single response signal for the group having a same result from said checking the at least one data block belonging to the corresponding group; and transmitting the respective response signal for each data block for the group having a different result from said checking the at least one data block belonging to the corresponding group, wherein, in the third scheme, the index instructs a specific combination of the response signal for the at least one data block in an index table as a set of combinations of the response signal for the at least one data block per each group, and wherein the index table includes combinations of the response signal for the at least one data block as many as the number of indexes decided according to a retransmission probability for the data block and the number of simultaneously processed blocks.

2. The method of claim 1, wherein, in said transmitting the response signal, the selection of transmitting scheme from among the first to third schemes is decided via instruction information from the at least one transmitter or by the receiver in accordance with an available radio resource state.

3. The method of claim 1, wherein the second scheme is carried out in a manner of allocating the response signal for each group in accordance with user identification information on each group obtained from a bitmap of UL-MAP in a bitmap of DL_HARQ_ACK_IE of DL-MAP and transmitting the allocated response signal.

4. The method of claim 3, wherein if the results of said checking for the at least one data block belonging to each group is different, the second scheme is further carried out in a manner of allocating the response signal for the at least one data block belonging to each group in an order of user identification information order obtained from UL-MAP, to the bitmap of the DL_HARQ_ACK_IE of the DL-MAP, wherein the allocating is carried out for the at least one group having the different result.

5. The method of claim 1, wherein if retransmission probability for the at least one data block associated with a channel environment between the transmitter and the receiver is smaller than a first threshold, the single response signal is a group ACK (acknowledgement) signal when the at least one data block belonging to the prescribed group is successfully received.

6. The method of claim 1, wherein if retransmission probability for the at least one data block associated with a channel environment between the transmitter and the receiver is smaller than a first threshold, the response signal transmitted in case of the different check result of the at least one data block belonging to the prescribed group further includes a group NAK (No ACK).

7. The method of claim 1, wherein if retransmission probability for the at least one data block associated with a channel environment between the transmitter and the receiver is greater than a second threshold, the single response signal is a group NAK signal when the at least one data block belonging to the prescribed group is not successfully received.

8. The method of claim 1, wherein if retransmission probability for the at least one data block associated with a channel environment between the transmitter and the receiver is greater than a second threshold, the response signal, which is transmitted in case that a different result exists among check results of the at least one data block belonging to the prescribed group, further includes a group ACK signal.

9. The method of claim 1, wherein the single response signal is not transmitted to the transmitter for the group having a same check result for the at least one data block belonging to the prescribed group.

10. The method of claim 1, wherein the retransmission probability is decided using information instructing a channel status transmitted by the at least one transmitter or by checking the channel status by the receiver.

11. The method of claim 1, wherein the index table includes a case that the response signal for the at least one data block is fully ACK (acknowledgement) and a case that the response signal for the at least one data block is fully NAK (Not ACK).

12. The method of claim 11, wherein if the retransmission probability is smaller than a prescribed value, the index table includes a case that ACK signals are dominant as the response signal for the at least one data block.

13. The method of claim 11, wherein if the retransmission probability is greater than a prescribed value, the index table includes a case that NAK signals are dominant as the response signal for the at least one data block.

14. The method of claim 12, wherein if the response signal for the at least one data block is not in the index table, the response signal for the at least one data block is fully NAK.

15. The method of claim 14, wherein in the third scheme, subcarrier of tiles amounting to a prescribed number of subchannels for carrying uplink ACK channel is transmitted by allocating an orthogonal-modulated sequence per an index.

16. The method of claim 15, wherein the orthogonal-modulated sequence allocated per an index has a mutually orthogonal characteristic.

17. The method of claim 16, wherein the orthogonal-modulated sequence of a corresponding index signal is transmitted to the transmitter by fixing a number of prescribed subchannels regardless of a number of the at least one data block transmitted by being grouped into the at least one group.

18. The method of claim 16, wherein the orthogonal-modulated sequence of a corresponding index signal is transmitted to the transmitter by incrementing a number of subchannels by a predetermined unit in proportion to a number of the at least one data block transmitted by being grouped into the at least one group.

19. The method of claim 16, wherein the orthogonal-modulated sequence of a corresponding index signal is transmitted to the transmitter by fixing a number of subchannels or incrementing the number of the subchannels by a predetermined unit in accordance with a number of the at least one data block transmitted by being grouped into the at least one group.

20. A method for at least one transmitter to receive a response signal for a transmission signal from a receiver in a communication system, the method comprising:
receiving at least one response signal instructing a presence or non-presence of successful reception of at least one data block transmitted from the receiver, wherein the at least one data block is grouped into at least one group;
deciding a transmission scheme of the response signal from among a first scheme of transmitting at least one response signal per each data block, a second scheme of transmitting the at least one response signal by including a group response signal for each group and a third scheme of transmitting an index of a data block signal set belonging to the each group is used to transmit the at least one response signal; and
checking the presence or non-presence of successful transmission of the at least one data block transmitted to the receiver according to the decided response signal transmitting scheme and the at least one response signal,
wherein, in the second scheme, the at least one receiver transmits a single response signal for each group and the second scheme comprises:
receiving a single response signal for the group having a same result from said checking the at least one data block belonging to the corresponding group; and
receiving the respective response signal for each data block for the group having a different result from said checking the at least one data block belonging to the corresponding group, wherein the index of the third scheme instructs a specific combination of the response signal for the at least one data block in an index table as a set of combinations of the response signal for the at least one data block per each group, and wherein the index table includes combinations of the response signal for the at least one data block as many as the number of indexes decided according to retransmission probability for the data block and the number of simultaneously processed blocks.

21. The method of claim 20, wherein the selection of transmitting scheme from among the first to third schemes is decided via instruction information from the at least one transmitter or by the receiver in accordance with an available radio resource state.

22. The method of claim 20, further comprising:

deciding whether to retransmit the at least one data block to the receiver or transmit at least one new data block to the receiver in accordance with the at least one response signal.

* * * * *